(12) United States Patent  (10) Patent No.: US 7,660,040 B2
Starry et al.  (45) Date of Patent: *Feb. 9, 2010

(54) DIFFUSE REFLECTIVE ARTICLE

(75) Inventors: Adam Ben Starry, Vienna, WV (US);
William John Gambogi, Jr.,
Wilmington, DE (US); Robert William Johnson, Kennett Square, PA (US);
Edwin James Lightfoot, Amherst, NY (US); Hyunkook Shin, Wilmington, DE (US); Robert D. Smith-Gillespie,
Eugene, OR (US); Torence John Trout, Jr., West Chester, PA (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 182 days.

This patent is subject to a terminal disclaimer.

(21) Appl. No.: 11/349,487

(22) Filed: Feb. 7, 2006

(65) Prior Publication Data
US 2006/0262310 A1  Nov. 23, 2006

Related U.S. Application Data

(60) Provisional application No. 60/681,736, filed on May 17, 2005.

(51) Int. Cl.
*G02B 5/02* (2006.01)
*G02B 13/20* (2006.01)
(52) U.S. Cl. .................................................. 359/599
(58) Field of Classification Search .................. 359/599
See application file for complete search history.

(56) References Cited

U.S. PATENT DOCUMENTS

| 3,081,519 A | 3/1963 | Blades et al. |
| 3,227,794 A | 1/1966 | Anderson et al. |
| 3,860,369 A | 1/1975 | Brethauer et al. |
| 4,912,720 A | 3/1990 | Springsteen |

(Continued)

FOREIGN PATENT DOCUMENTS

WO  WO 97/32224  9/1997

(Continued)

OTHER PUBLICATIONS

Paul Rollin, Flash Spun Sheet Material Having Improved Breathability U.S. Appl. No. 60/558,289, filed Mar. 31, 2004.*

(Continued)

*Primary Examiner*—Joshua L Pritchett

(57) ABSTRACT

A diffuse reflective article is provided including a diffuse reflector of light positioned within a structure defining an optical cavity. The diffuse reflector is a nonwoven sheet containing a plurality of inter-fiber and intra-fiber pores of optimal light scattering dimension. Also provided is an optical display, including: (i) a structure defining an optical cavity; (ii) a light source positioned within the optical cavity; (iii) a display panel through which light from the light source passes; and (iv) a diffuse reflector positioned within the optical cavity for reflecting light from the light source toward the display panel, wherein the diffuse reflector is a nonwoven sheet containing a plurality of inter-fiber and intra-fiber pores of optimal light scattering dimension.

77 Claims, 9 Drawing Sheets

U.S. PATENT DOCUMENTS

| | | | |
|---|---|---|---|
| 4,999,222 | A | 3/1991 | Jones et al. |
| 5,976,686 | A | 11/1999 | Kaytor et al. |
| 5,982,548 | A | 11/1999 | McGregor et al. |
| 6,010,970 | A | 1/2000 | McGinty et al. |
| 6,036,327 | A | 3/2000 | Blonder et al. |
| 6,057,961 | A * | 5/2000 | Allen et al. .................. 359/494 |
| 6,123,442 | A | 9/2000 | Freier et al. |

FOREIGN PATENT DOCUMENTS

WO     WO 2005/098119 A1     10/2005

OTHER PUBLICATIONS

Berns et al, "Derivation of the Standard Observers", Billmeyer and Saltzman Principles of Color Technology, 2000, pp. 45-62, 3rd ed., Wiley, New York.

Rootare, H.M., "Review of Mercury Porosimetry", Advanced Experimental Techniques in Powder Metallurgy, 1970, pp. 225-252, vol. 5, Plenum Press, New York-London.

Brunauer et al, "Adsorption of Gases in Multimolecular Layers" J. Am. Chem. Soc., v. 60, pp. 309-319 (1938).

S. P. Stoll, "An Investigation of the Reflective Properties of Tyvek Papers and Tetratex PTFE Film", Brookhaven National Laboratory PHENIX Note #245, pp. 1-8, Jul. 1, 1996.

S. P. Stoll, "Comparison of New and Old Tyvek Style 1055B", Brookhaven National Laboratory PHENIX Note #245 Addendum, pp. 1-2, Apr. 8, 1997.

Cremaldi et al, "Scans of Tyvek/Laminate Reflectivity", Pierre Auger Observatory "GAP Notes", GAP 2000-056, pp. 1-8 (2000).

Arteaga-Valazquez et al, "Diffuse reflectivity of Tyvek in air and water, and anisotropical effects", Nuclear Physics B, Proceedings Supplements 97 (2001), pp. 231-234, (2001).

Arteaga-Velazquez et al, "A measurement of the diffuse reflectivity of 1056 Tyvek in air and water", Nuclear Instruments and Methods in Physics Research A 553 (2005), pp. 312-316 (2005).

Hojvat, C., "Comparison of the UV Reflectivity from Tyvek", Pierre Auger Observatory—GAP Notes, GAP 97-007, pp. 1-3 (Feb. 22, 1996).

Yodh et al, "Performance of Water Tanks and Igloos", Department of Physics and Astronomy paper, University of California Irvine, Irvine, CA, (Nov. 26, 1996).

Hasenbalg et al, "Tyvek diffuse reflectivity", Pierre Auger Observatory—GAP Notes, GAP 97-035, pp. 1-5, (May 23, 1997).

\* cited by examiner

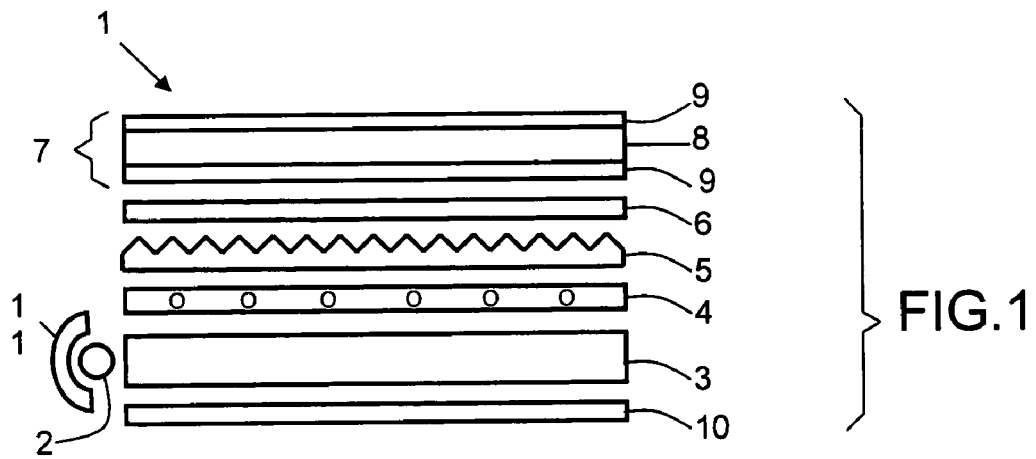
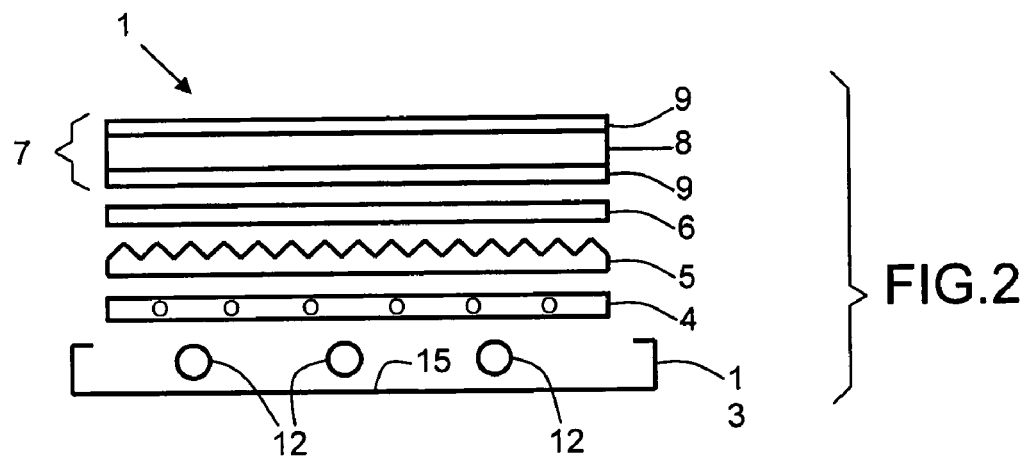
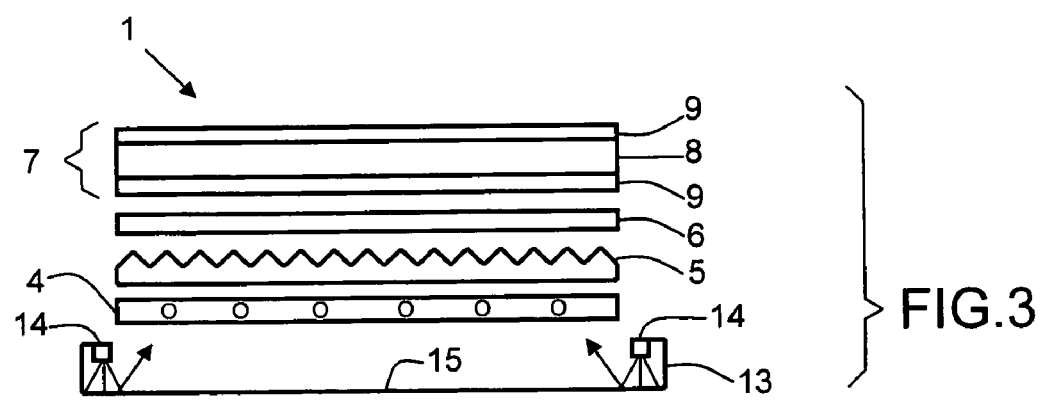

DIFFUSE REFLECTIVE ARTICLE

BACKGROUND OF THE INVENTION

1. Field of the Invention.

The present invention relates to a diffuse reflective article having a nonwoven sheet diffuse reflector containing pores of high light scattering efficiency and having a high photopic reflectance of visible light.

2. Description of Related Art.

Special light reflectant surfaces are used in a variety of applications requiring visible light to be almost completely reflected while providing an even distribution of light from the surface. While mirrored surfaces can provide nearly perfect reflectivity of visible light, the light energy exiting these surfaces does so only at an angle equal to the incident angle. For many applications it is important that visible light be reflected from a surface in a distribution. This property is referred to as diffuse or Lambertian reflectance. Lambertian reflection of light is the uniform diffuse reflection of light from a material in all directions with no directional dependence for the viewer according to Lambert's cosine law. Diffuse reflection originates from a combination of external scattering of light from features on the surface of a material, and internal scattering of light from features within a material. Internal light scattering can arise, for example, from features within a material such as pores, particles or different crystalline phases. The light scattering cross section per unit feature volume of materials containing closely spaced refractive index inhomogenaities is maximized when the mean diameter of the features is slightly less than one-half the wavelength of the incident light. The degree of light scattering is also increased when there is a large difference in the refractive index of the scattering feature and the phase in which it is dispersed.

Diffuse reflectivity of visible light is critical in many applications. Direct view displays used in electronic equipment (e.g., instrument panels, portable computer screens, liquid crystal displays (LCDs)), whether relying on supplemental lights (e.g., backlight) or ambient light, require diffuse reflectant back surfaces to maximize image quality and intensity. Reflectivity is particularly critical with backlit direct view displays in battery powered equipment, where reflectivity improvements directly relate to smaller required light sources and thus lower power demands.

Portable computer LCDs are a substantial and demanding market requiring high levels of diffuse reflection of visible light from very thin materials. For certain markets it is critical that the backlight reflector is relatively thin, i.e., less than 250 µm and often less than 150 µm, to minimize the thickness of the completed display.

The reflective material used in LCD backlights has a significant effect on the brightness, uniformity, color and stability of the backlight unit and, ultimately, the LCD module. For a direct view LCD backlight, requirements for the reflector include high photopic reflectance (e.g., >95%) and high stability under use conditions including cavity temperatures of 50° C. to 70° C., high stability to ultraviolet (UV) light from cold cathode fluorescent lamp (CCFL) sources, high humidity and temperature cycling. In direct view backlights, the reflector is an integral part of the backlight unit and, therefore, the physical properties of the material are also important. Requirements for an edgelit backlight differ in that the operating temperature is typically lower and the need for UV stability is less due to the UV absorption in the light guide. However, additional requirements on edgelit backlight reflectors include the need to make uniform contact with the light guide without damaging it, and minimizing reflector thickness.

Due to the many different applications that exist for reflectant materials, it is not surprising that there are a wide variety of commercially available products with an array of diffuse reflective properties. Until the present invention, the best known diffuse reflective material with excellent diffuse reflectivity was that described in U.S. Pat. No. 4,912,720 and sold under the trademark SPECTRALON® by Labsphere, Inc., North Sutton, N.H., USA. This material comprises lightly packed granules of polytetrafluoroethylene having a void volume of about 30 to 50% and is sintered into a relatively hard cohesive block so as to maintain such void volume. Using the techniques taught by U.S. Pat. No. 4,912,720, it is asserted that exceptionally high diffuse visible light reflectance characteristics can be achieved with this material, with photopic reflectance over the visible wavelengths of light of better than 99%. Despite the advantages of the SPECTRALON material, it is not generally available in very thin films of less than 250 µm, such as those needed for the laptop LCD market, and furthermore at these thickness levels, adequate reflection performance is not obtained.

Gore™ DRP®, produced by W. L. Gore & Associates, Inc., DE, USA, is a reflectant material of expanded polytetrafluoroethylene (PTFE) comprising polymeric nodes interconnected by fibrils defining a microporous structure. This material is highly flexible and has excellent diffuse reflectant properties. Its shortcoming is higher cost. Moreover, at a thickness desirable for many optical display applications (i.e., less than 250 µm), this material has reduced reflectivity over the blue range of the visible spectrum (as shown in comparative example 4 of U.S. Pat. No. 5,976,686). Such a reflector sheet having reduced reflectivity over the blue range requires display manufacturers to modify the display in order to transmit more light in that region in the direction of the viewer, which undesirably consumes more energy.

U.S. Pat. No. 5,976,686 discloses a light conduit containing a 150 µm to 250 µm thick nonwoven polyethylene fabric diffuse light reflector. However, such materials were reported to have an average reflectance varying from 77% to 85%, depending on the thickness, over the wavelength range of 380 to 720 nm. This patent disparages both the random fiber construction of the nonwoven and its variation in thickness as being adversely noticeable in this application and discloses these reflectors in comparative examples.

Filled microvoided poly(ethylene terephthalate) (PET) films, also referred to in this field as "White PET", are commercial diffuse reflectors used in optical display applications. These materials are sold in different thickness with reflectivity varying with thickness. White PET films around 190 µm thick find utility in notebook personal computer (PC) LCDs and desktop PC LCDs. These films typically have an average reflectance in the visible light wavelengths of about 95%. A 190 µm thick White PET reflector is sold by Toray Industries, Inc. of Chiba, Japan, commercially available as "E60L". However, E60L suffers from poor resistance to UV radiation and requires a UV coating which raises the cost of the reflector as well as causes a reduction in the reflectivity at wavelengths in the blue region of the visible spectrum (i.e., wavelengths less than about 400 nm).

Improved and inexpensive diffuse reflectors are needed for visible light management applications that will allow for production of more affordable and energy efficient optical displays.

BRIEF SUMMARY OF THE INVENTION

The prior art is silent as to diffuse reflective articles containing nonwoven diffuse reflectors having a high photopic reflectance of visible light. The present invention addresses this need by providing diffuse reflective articles containing nonwoven diffuse reflectors having a high photopic reflectance of visible light and high diffusivity, as well as improved whiteness and improved optical, UV and temperature stability. More specifically, a new diffuse reflector for optical display backlights has been developed to address these needs in direct view and edgelit optical display backlight applications.

In accordance with the present invention there is offered a diffuse reflective article comprising a diffuse reflector of light positioned within a structure defining an optical cavity, wherein the diffuse reflector comprises a nonwoven sheet containing a plurality of pores, wherein the specific pore volume is at least about 34 cm$^3$/m$^2$ for pores having a mean pore diameter as measured by mercury porosimetry of from 0.01 µm to 1.0 µm.

The present invention further includes an optical display, comprising: (i) a structure defining an optical cavity; (ii) a light source positioned within the optical cavity; (iii) a display panel through which light from the light source passes; and (iv) a diffuse reflector positioned within the optical cavity for reflecting light from the light source toward the display panel, wherein the diffuse reflector comprises a nonwoven sheet containing a plurality of pores, wherein the specific pore volume is at least about 10 cm$^3$/m$^2$ for pores having a mean pore diameter as measured by mercury porosimetry of from about 0.01 µm to about 1.0 µm.

The present invention further includes a method of improving light reflectivity in a device requiring diffuse reflectivity of light comprising: (i) providing a nonwoven sheet having a plurality of pores wherein the specific pore volume is at least about 34 cm3/m$^2$ for pores having a mean pore diameter as measured by mercury porosimetry of from about 0.01 µm to about 1.0 µm; and (ii) positioning the nonwoven sheet within the device to cause light energy to reflect off of the nonwoven sheet.

FIGURES

FIG. 1 is a cross sectional view of a side-lit liquid crystal optical display utilizing a diffuse reflector according to the present invention.

FIG. 2 is a cross sectional view of a backlit liquid crystal optical display with a cold cathode fluorescent lamp light source utilizing a diffuse reflector according to the present invention.

FIG. 3 is a cross sectional view of a backlit liquid crystal optical display with a light emitting diode light source utilizing a diffuse reflector according to the present invention.

DETAILED DESCRIPTION

Figure 4:
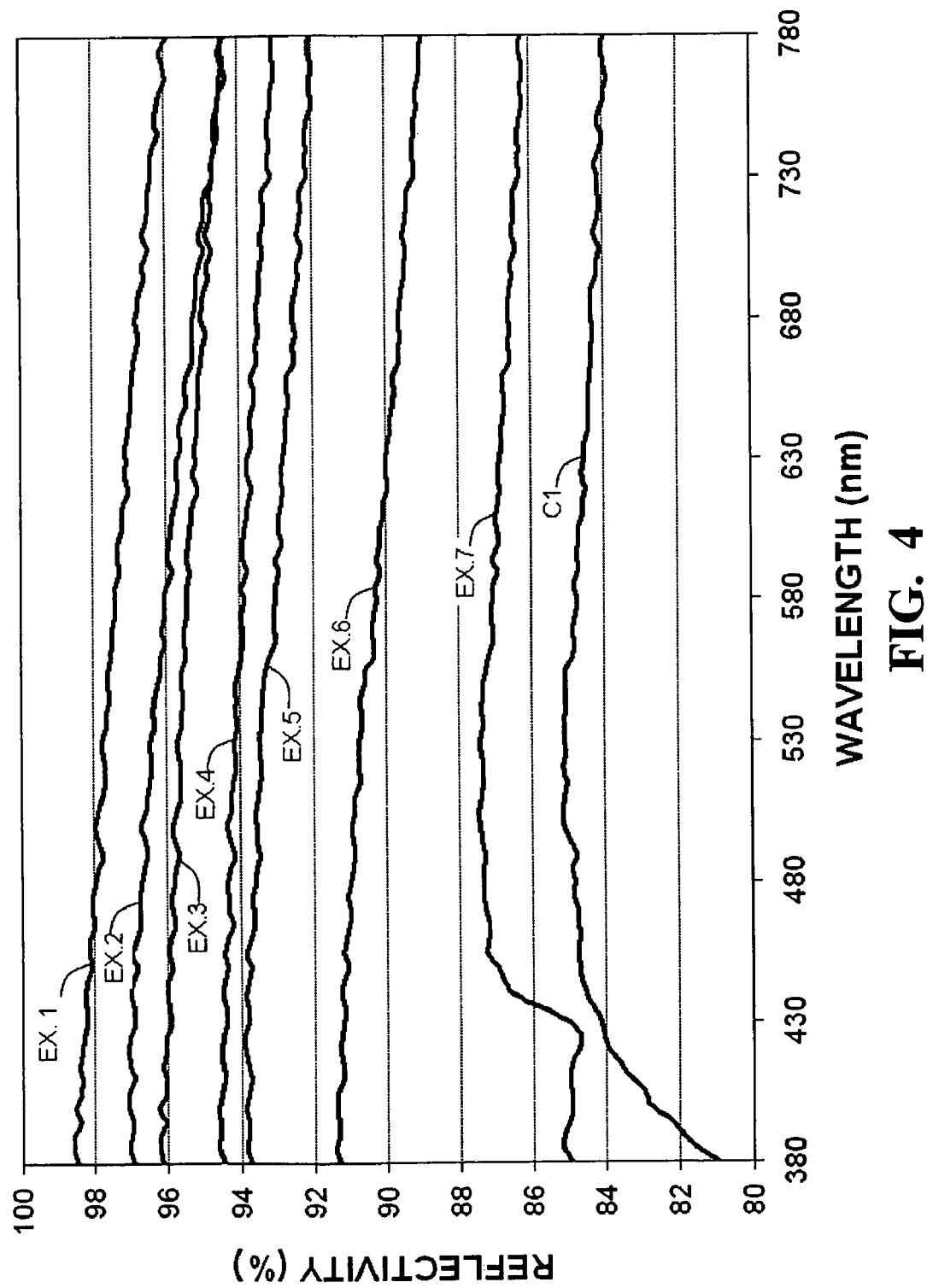
FIG. 4 is a graph of reflectivity (%) versus wavelength (nm) for nonwoven sheets utilized in diffuse reflectors according to the present invention.

The term "light" as used herein means electromagnetic radiation in the visible light portion of the spectrum, from 380 nm to 780 nm wavelength. Unless stated otherwise, "photopic reflectance" (R$_{VIS}$) of light herein means the reflectance (i.e., diffuse and specular reflectance) as seen by a human observer over the visible light wavelength range of 380 nm to 780 nm. Photopic reflectance (R$_{VIS}$) is calculated from total reflectance spectral data using illuminant D65 and the CIE Standard Photopic observer described in "Billmeyer and Saltzman Principles of Color Technology", 3$^{rd}$ Edition.

The present diffuse reflective article or optical display comprises a diffuse reflector of light positioned within a structure defining an optical cavity. "Optical cavity" refers herein to an enclosure designed to receive light from a light source, and condition and direct such light toward an object benefiting from illumination. Optical cavities include structures for integrating, redirecting and/or focusing light from a source onto a receiver and may use air or high refractive index elements as the cavity medium. The geometrical shape of the structure is not limited. Example structures containing optical cavities include luminaires, copying machines, projection display light engines, integrating sphere uniform light sources, sign cabinets, light conduits and backlight assemblies. In certain embodiments, such as backlight units for liquid crystal displays (LCDs), the optical cavity may include a lightguide or waveguide. Where the diffuse reflective article is a component of an optical display, optical cavity refers to an enclosure designed to contain a light source and direct the light from the light source toward a display panel. Display panels include static and dynamic (addressable) display types.

The diffuse reflective article or optical display of the present invention contains a light source positioned within the optical cavity. "Light source" refers herein to emitters of visible light and can be a single light source within an optical cavity or multiple light sources within an optical cavity. Example light sources include bulb and tube lamps of type incandescent, mercury, metal halide, low pressure sodium, high pressure sodium, arc, compact fluorescent, self ballasted fluorescent, cold cathode fluorescent lamp (CCFL), light emitting diode (LED) and similar apparatus capable of emitting visible light.

The present diffuse reflective article or optical display contains a display panel through which light from the light source passes. "Display panel" refers herein to transmissive devices that modulate the transmission of light from the light source, and in certain embodiments, modulate the light for the purpose of conveying an image in the form of visible light to a viewer. In the embodiment where the structure defining the optical cavity is a luminaire or sign cabinet system for the purpose of conveying a static image to a viewer, example display panels include polymer or glass panels with a static image contained thereon (e.g., a text or pictorial image) or alternately, no image (e.g., a fluorescent light diffuser). In the embodiment where the structure defining an optical cavity is a backlight unit for a liquid crystal display for the purpose of conveying static and/or changing images to a viewer, an example display panel includes a liquid crystal with an image which changes in response to an electronic signal.

The present diffuse reflective article or optical display contains a diffuse reflector positioned within the optical cavity for reflecting light toward an object benefiting from illumination. The diffuse reflector is positioned within the optical cavity so that it reflects back toward the object light within the optical cavity which is not directed toward the object. In an optical display, the diffuse reflector is positioned behind the optical display light source illuminating the display panel. The light scattering and diffuse reflection characteristics of diffuse reflectors according to the present invention provides more overall diffuse lighting, e.g., a more overall diffuse light source and therefore a more evenly lit or uniformly illuminated optical display.

Schematic figures of several embodiments of optical displays utilizing diffuse reflective articles according to the present invention are shown in FIGS. 1-3. FIG. 1 is a cross sectional view of a side-lit liquid crystal optical display utilizing a diffuse reflector according to the present invention. In FIG. 1, an optical display 1 is shown having a fluorescent light source 2 coupled to an optical cavity containing a plastic light guide 3. A diffuser 4, an optional brightness enhancing film 5, such as films described in U.S. Pat. Nos. 4,906,070 and 5,056,892 and available from Minnesota Mining and Manufacturing Co. (3M), Minneapolis, Minn., USA, and an optional reflective polarizer film 6 (also available from 3M) as described in PCT publications WO 91/5327 and WO 97/32224, are placed on top of the guide 3 and act to redirect and reflectively polarize the light emitted from the guide 3 toward a liquid crystal display panel 7 and a viewer. A liquid crystal display panel 7 is placed on top of the reflective polarizing film 6 and is typically constructed of a liquid crystal 8 contained between two polarizers 9.

The light guide 3 directs light towards the display panel 7 and ultimately a viewer. Some light is reflected from the back surface of the light guide. A diffuse reflector of the present invention 10 is placed behind the light guide 3 and reflects light towards the liquid crystal display panel 7. It also reflects and randomizes the polarization of the light reflected from the reflective polarizing film 6 and brightness enhancing film 5 layers. The diffuse reflector 10 is a highly reflective, high diffusivity surface that enhances the optical efficiency of the optical cavity. The diffuse reflector 10 scatters and reflects light diffusely, depolarizes the light, and has high reflectance over the visible wavelength range.

The diffuse reflector 10 is an element of a light recycling system. The diffuse reflector (i) reflects light rejected from the reflective polarizing film 6 and/or from the brightness enhancement film 5, and (ii) gives that light another opportunity to reach the liquid crystal display panel 7 and ultimately a viewer. This rejecting and recycling can occur numerous times increasing the luminance of the optical display (i.e., the amount of light directed towards the viewer).

This increased optical efficiency of the diffuse reflector can be used to reflect incident light between layer 5 and the diffuse reflector 10 to increase display luminance by controlling the angles over which light is emitted. For instance, brightness enhancing film 5 transmits light within a specific, and narrow angular range and reflects light over another, specific and wider angular range. The reflected light is scattered by the diffuse reflector 10 into all angles. The light within the transmission angles of the brightness enhancing layer 5 is transmitted towards the viewer. Light in the second angular range is reflected by layer 5 for additional scattering by the diffuse reflector 10.

The increased optical efficiency of the diffuse reflector 10 can be used to reflect incident light between the reflective polarizer film 6 and the diffuse reflector 10 to increase display luminance by controlling the polarization state of the light transmitted through the reflective polarizer film 6. Most displays have an absorbing polarizer 9 applied to the back of the display panel 8. At least one half of the available light is absorbed when the display is illuminated by unpolarized light. As a result, display luminance is decreased and the display polarizer 9 is heated. Both adverse situations are overcome with the use of a reflective polarizer film 6, because the reflective polarizer film 6 transmits light of one linear polarization state and reflects the other linear polarization state. If the transmission axis of the reflective polarizer film 6 is aligned with the absorbing polarizer transmission axis, the transmitted light is only weakly absorbed by the absorbing polarizer. Also, the light in the reflected polarization state is not absorbed at all by the absorbing polarizer. Instead, it is reflected towards the diffuse reflector 10. The diffuse reflector 10 depolarizes the light, creating a polarization state that has equal polarization components in the reflective polarizer film transmission and reflection states. One half of the light transmits through the reflective polarizer layer 6 towards the viewer. Light in the reflected polarization state, or "undesirable" state, is again scattered by the diffuse reflector 10, providing yet another chance for additional polarization conversion.

Additionally, a diffuse reflector 11 according to the present invention may be placed behind or around the light source 2, such as a cold cathode fluorescent lamp (CCFL) to increase light coupling efficiency into the plastic light guide 3. The diffuse reflector 11 may be used alone, or in combination with a specular reflector to increase the total reflectance of the construction. When such a specular reflector is used, it is positioned behind the diffuse reflector 11 such that the diffuse reflector remains facing the light source 2.

The increased optical efficiency of the diffuse reflector according to the present invention can be used to increase the reflective efficiency of an optical cavity and/or to mix discrete wavelengths of light to make a uniform colored or white light source. FIG. 2 is a cross sectional view of a backlit liquid crystal optical display with a cold cathode fluorescent lamp light source utilizing a diffuse reflector according to the present invention. In the optical display 1 shown in FIG. 2, three fluorescent lamps 12 are depicted in an optical cavity 13. All of the lamps may be white or each lamp may be a selected color, such as red, green and blue. FIG. 3 is a cross sectional view of an alternate configuration of a backlit liquid crystal optical display with a light emitting diode light source utilizing a diffuse reflector according to the present invention. In the optical display 1 shown in FIG. 3, the liquid crystal optical display device is shown with two light emitting diodes (LEDs) 14 as the light source providing light to an optical cavity 13. The diodes may be colored or white. In both FIGS. 2 and 3, the optical cavity 13 is lined with a diffuse reflector 15. Diffuse reflector 15 both increases reflectance and mixes the discrete light colors adequately to form a white light source with good spatial light emitting uniformity for illumination of the liquid crystal display panel 7.

The diffuse reflective article or optical display of the present invention contains a diffuse reflector comprising a nonwoven sheet. Nonwoven sheet and nonwoven web as used herein means a structure comprising individual fibers that are formed and then positioned in a random manner to form a planar material comprising the fibers without an identifiable pattern and without knitting or weaving. As used herein, the term fiber is intended to include all different types of fibrous materials that can be used to make nonwoven sheets. They include staple fibers used for carding, wet-lay, air-lay and dry-forming; continuous or discontinuous filaments made by melt spinning, solution spinning, melt blowing; plexifilamentary film-fibrils obtained by flash spinning; and fibrids prepared by fibridation processes. Examples of nonwoven sheets include spunbond webs, melt blown webs, multi-directional, multi-layer carded webs, air-laid webs, wet-laid webs, spun-laced webs and composite webs comprising more than one nonwoven sheet. As used herein, the term nonwoven sheet does not include paper made from wood pulp or fabrics that are woven, knitted or tufted, nor does it include films.

Nonwoven sheet diffuse reflectors according to the present invention preferably comprise flash-spun fibers. The term flash-spun fibers as used herein means fibers produced by the following general process, also disclosed in U.S. Pat. No. 3,860,369. As disclosed in this patent, flash-spinning is conducted in a chamber, sometimes referred to as a spin cell, which has a vapor-removal port and an opening through which non-woven sheet material produced in the process is removed. Polymer solution (or spin liquid) is continuously or batchwise prepared at an elevated temperature and pressure and provided to the spin cell. The pressure of the solution is greater than the cloud-point pressure, which is the lowest pressure at which the polymer is fully dissolved in the spin agent forming a homogeneous single phase mixture. The single phase polymer solution passes through a letdown orifice into a lower pressure (or letdown) chamber. In the lower pressure chamber, the solution separates into a two-phase liquid-liquid dispersion. One phase of the dispersion is a spin agent-rich phase which comprises primarily spin agent and the other phase of the dispersion is a polymer-rich phase which contains most of the polymer. This two phase liquid-liquid dispersion is forced through a spinneret into an area of much lower pressure (preferably atmospheric pressure) where the spin agent evaporates very rapidly (flashes), and the polyolefin emerges from the spinneret as plexifilaments.

The term plexifilamentary or plexifilaments as used herein means a three-dimensional integral network of a multitude of thin, ribbon-like, film-fibrils of random length and with a mean fibril thickness of less than about 4 µm and a median width of less than about 25 µm. In plexifilamentary structures, the film-fibrils are generally coextensively aligned with the longitudinal axis of the structure and they intermittently unite and separate at irregular intervals in various places throughout the length, width and thickness of the structure to form a continuous three-dimensional network. Such structures are described in further detail in U.S. Pat. No. 3,081,519 and in U.S. Pat. No. 3,227,794.

The plexifilaments are stretched in a tunnel and are directed to impact a rotating baffle. The rotating baffle has a shape that transforms the plexifilaments into a flat web, which is about 5-15 cm wide, and separates the fibrils to open up the web. The rotating baffle further imparts a back and forth oscillating motion having sufficient amplitude to generate a wide back and forth swath. The web is laid down on a moving wire laydown belt located below the spinneret, and the back and forth oscillating motion is arranged to be generally across the belt to form the nonwoven sheet.

As the web is deflected by the baffle on its way to the moving belt, it enters a corona charging zone between a stationary multi-needle ion gun and a grounded rotating target plate. The multi-needle ion gun is charged to a DC potential of by a suitable voltage source. The charged web is carried by a high velocity spin agent vapor stream through a diffuser consisting of two parts: a front section and a back section. The diffuser controls the expansion of the web and slows it down. Aspiration holes are drilled in the back section of the diffuser to assure adequate flow of gas between the moving web and the diffuser back section to prevent sticking of the moving web to the diffuser back section. The moving belt is grounded so that the charged web is electrostatically attracted to the belt and held in place thereon.

Overlapping web swaths from a multiplicity of plexifiliments are collected on the moving belt and held there by electrostatic forces are formed into the nonwoven sheet of the width desired with a thickness controlled by the belt speed. The sheet is then consolidated which involves compressing the sheet between the belt and a consolidation roll into a structure having sufficient strength to be handled outside the chamber. The sheet is then collected outside the chamber on a windup roll. The sheet can be bonded using methods known in art, such as thermal bonding.

Thermal bonding relates to conventional processes in which a consolidated nonwoven sheet comprising polymer is heated to a temperature slightly below, typically in the range of 3° C. to 8° C. below, the polymer melting point while applying force normal to the face of the sheet. Under such conditions, polymer at points of contact on the surface of separate fibers will mix and form a bonding point (bond) which secures the fibers together. Known methods for thermal bonding of nonwovens includes hot-air bonding on a tenter frame, pressing between heated platens, bonding while restrained against a hot roll by a heavy blanket, calendering with hot rolls and point-bonding with embossed rolls.

Nonwoven sheet diffuse reflectors according to the present invention include those comprising spunbond fibers. The term spunbond fibers as used herein means fibers that are melt-spun by extruding molten polymer as fibers from a plurality of fine, usually circular, capillaries of a spinneret with the diameter of the extruded fibers then being rapidly reduced by drawing and then quenching the fibers. Other fiber cross-sectional shapes such as oval, tri-lobal, multi-lobal, flat, hollow, etc. can also be used. Spunbond fibers are generally substantially continuous and usually have an average diameter of greater than about 5 µm. Spunbond nonwoven webs are formed by laying spunbond fibers randomly on a collecting surface such as a screen or belt, and are bonded using methods known in art, such as thermal bonding.

Nonwoven sheet diffuse reflectors of the present invention include those comprising melt blown fibers. The term melt blown fibers as used herein means fibers that are melt-spun and then attenuated by melt blowing, which comprises extruding a melt-processible polymer through a plurality of capillaries as molten streams into a high velocity gas (e.g., air) stream. The high velocity gas stream attenuates the streams of molten polymer to reduce their diameter and form melt blown fibers having a diameter between about 0.5 µm and about 10 µm. Melt blown fibers are generally discontinuous fibers but can also be continuous. Melt blown fibers carried by the high velocity gas stream are generally deposited on a collecting surface to form a melt blown web of randomly dispersed fibers. Melt blown fibers can be tacky when they are deposited on the collecting surface, which generally results in bonding between the melt blown fibers in the melt blown web. Melt blown webs can also be bonded using methods known in the art, such as thermal bonding.

Nonwoven sheet diffuse reflectors according to the present invention include those comprising staple-based nonwovens. Staple-based nonwovens can be prepared by a number of methods known in the art, including carding or garneting, air-laying, or wet-laying of fibers and the staple-based nonwovens can be needlepunched, spunlaced, thermal bonded and chemical bonding. The staple fibers preferably have a denier per fiber between about 0.5 and about 6.0 and a fiber length of between about 0.25 inch (0.6 cm) and about 4 inches (10.1 cm).

Nonwoven sheet diffuse reflectors according to the present invention include those comprising wet-laid fibrids as disclosed in U.S. Pat. No. 2,999,788.

Polymers from which nonwoven sheet diffuse reflectors according to the present invention can be made include polyolefin (e.g., polyethylene, polypropylene, polymethylpentene and polybutylene), acrylonitrile-butadiene-styrene (ABS) resin, polystyrene, styrene-acrylonitrile, styrene-butadiene, styrene-maleic anhydride, vinyl plastic (e.g., polyvinyl chloride (PVC)), acrylic, acrylonitrile-based resin, acetal, perfluoropolymer, hydrofluoropolymer, polyamide, polyamide-imide, polyaramid, polyarylate, polycarbonate, polyesters, (e.g., polyethylene napthalate (PEN)), polyketone, polyphenylene ether, polyphenylene sulfide and polysulfone. Preferred amongst the polymers are the polyolefins.

The term polyolefin as used herein means any of a series of largely saturated open chain polymeric hydrocarbons consisting of carbon and hydrogen. Typical polyolefins include, but are not limited to, polyethylene, polypropylene and polymethylpentene. Polyethylene and polypropylene are preferred.

The term polyethylene as used herein includes not only homopolymers of ethylene, but also copolymers wherein at least 85% of the recurring units arise from ethylene. A preferred polyethylene is linear high density polyethylene having an upper limit of melting range of about 1300 to 1 37° C., a density in the range of 0.94 to 0.98 g/cm$^3$ and a melt index (as defined by ASTM D-1238-57T, Condition E) of between 0.1 to 100, preferably between 0.1 and 4.

The term polypropylene as used herein includes not only homopolymers of propylene but also copolymers wherein at least 85% of the recurring units arise from propylene units.

A preferred embodiment of nonwoven sheet diffuse reflector comprises a consolidated sheet of flash-spun plexifilamentary film-fibrils, wherein the fibrils comprise polymer containing pores. The polymer preferably comprises polyolefin, especially polyethylene.

The present inventors discovered that diffuse reflectance by nonwoven sheets arises from a combination of light scattering from pores created by fiber interstices, and light scattering from pores within the fibers. Nonwoven sheets contain a plurality of pores that are defined herein as intra-fiber pores or inter-fiber pores. Intra-fiber pores are randomly distributed throughout the interior of a fiber and have a mean pore diameter measured by mercury porosimetry ranging from about 0.02 μm to about 0.5 μm. Inter-fiber pores are randomly distributed interstices between fibers in a nonwoven sheet and have a mean pore diameter measured by mercury porosimetry ranging from about 0.5 μm to about 9 μm. The visible light scattering cross section per unit pore volume, and thus diffuse reflectance, of the present nonwoven sheets is maximized for pores having a mean pore diameter of from about 0.2 μm to about 0.4 μm, slightly less than one-half the wavelength of visible light. The inventors have found that about one third of the light scattering by nonwoven sheets arises from inter-fiber pores having a mean pore diameter of about 1 μm and larger, and that about two thirds of the light scattering arises from the intra-fiber pores and inter-fiber pores having a mean pore diameter of less than about 1 μm.

"Specific pore volume" (also referred to herein as "SPV") is herein defined as the mathematical product of the nonwoven sheet average basis weight, in units of g/m$^2$, times pore volume, in units of cm$^3$/g, for a given mean pore diameter range. SPV has units of cm$^3$/m$^2$, and is a unit characterizing the volume of pores for a given mean pore diameter range that exists per square area of nonwoven sheet. Average basis weight is measured by the procedure of ASTM D3776, modified as appropriate for nonwoven sheet size. Nonwoven sheet pore volume for a given mean pore diameter range is obtained by known mercury porosimetry methodology as disclosed by H. M. Rootare in "A Review of Mercury Porosimetry" from Advanced Experimental Techniques in Powder Metallurgy, pp. 225-252, Plenum Press, 1970. "VP1" is herein defined as the volume of nonwoven sheet pores as measured by mercury porosimetry having a mean pore diameter of from 0.01 μm to 1.0 μm. "VP2" is herein defined as the volume of nonwoven sheet pores as measured by mercury porosimetry having a mean pore diameter of from 0.02 μm to 0.5 μm. SPV1 is herein defined as the specific pore volume relating to the VP1 mean pore diameter range, and SPV2 is herein defined as the specific pore volume relating to the VP2 mean pore diameter range.

Figure 8:
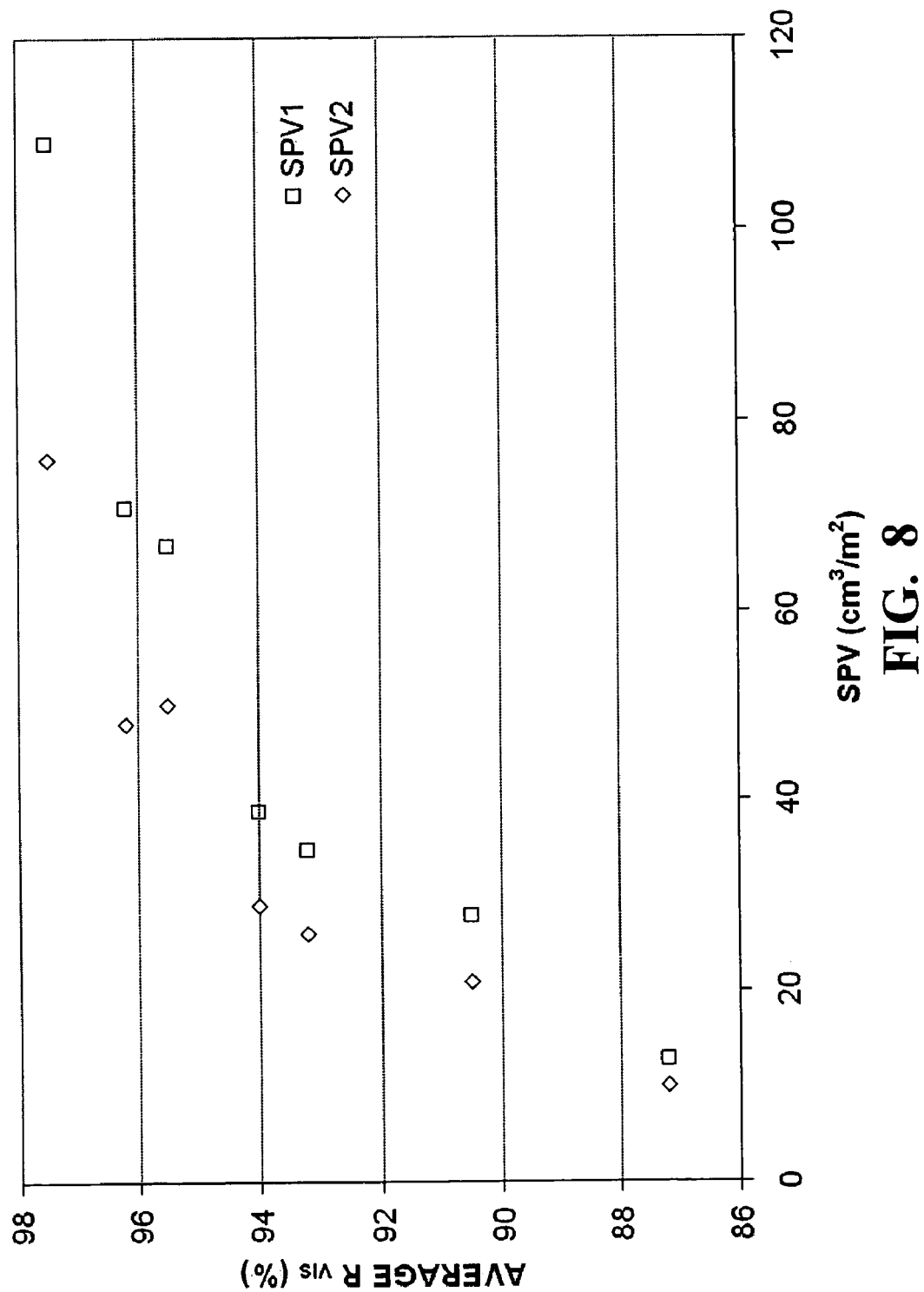
FIG. 8 is a graph of average R$_{VIS}$ (%) versus SPV1 and SPV2 (cm$^3$/m$^2$) for example nonwoven sheets.

The present inventors have discovered that plotting nonwoven sheet photopic reflectance (%) of visible light (i.e., light of wavelength range from 380 nm to 780 nm) versus specific pore volume (SPV) unexpectedly yields a smooth curve for nonwoven sheets. FIG. 8 is a graph of average $R_{VIS}$ (%) versus SPV1 and SPV2 (cm$^3$/m$^2$) for example 1-7 nonwoven sheets (flash-spun high density polyethylene sheets). SPV1 of about 10 cm$^3$/m$^2$ results in a photopic reflectance of visible light of at least about 85% for the nonwoven sheet. SPV1 of about 20 cm$^3$/m$^2$ results in a photopic reflectance of at least about 90%. SPV1 of about 30 cm3/m$^2$ results in a photopic reflectance of at least about 92%. SPV1 of about 40 cm$^3$/m$^2$ results in a photopic reflectance of at least about 94%. SPV1 of about 50 cm$^3$/m$^2$ results in a photopic reflectance of at least about 96%.

Intra-fiber pores in nonwoven sheets according to the present invention have a high scattering cross section per unit pore volume, and thus are primarily responsible for the high light scattering, and thus high diffuse reflectance, of the present reflectors. FIG. 8 is a graph of average $R_{VIS}$ (%) versus SPV1 and SPV2 (cm$^3$/m$^2$) for example 1-7 nonwoven sheets (flash-spun high density polyethylene sheets). Nonwoven sheets surprisingly contain a plurality of intra-fiber pores, and SPV2 of about 7 cm$^3$/m$^2$ results in a photopic reflectance of visible light of at least about 85% for the nonwoven sheet. SPV2 of about 16 cm$^3$/m$^2$ results in a photopic reflectance of at least about 90%. SPV2 of about 25 cm3/m$^2$ results in a photopic reflectance of at least about 92%. SPV2 of about 30 cm$^3$/m$^2$ results in a photopic reflectance of at least about 94%. SPV2 of about 40 cm$^3$/m$^2$ results in a photopic reflectance of at least about 96%.

Nonwoven sheets of utility in diffuse reflectors of diffuse reflective articles according to the present invention contain a plurality of pores, wherein SPV1 is at least about 34 cm$^3$/m$^2$, resulting in a photopic reflectance of visible light of at least about 93% for the nonwoven sheet. SPV1 in this embodiment is preferably at least about 40 cm$^3$/m$^2$ and more preferably at least about 50 cm$^3$/m$^2$. Intra-fiber pore related SPV2 in this embodiment is at least about 28 cm$^3$/m$^2$, resulting in a photopic reflectance of at least about 93%. SPV2 is preferably at least about 30 cm$^3$/m$^2$ and more preferably at least about 40 cm$^3$/m$^2$.

Nonwoven sheets of utility in diffuse reflectors of optical displays according to the present invention contain a plurality of pores, wherein SPV1 is at least about 10 cm$^3$/m$^2$, resulting in a photopic reflectance of visible light of at least about 85% for the nonwoven sheet. SPV1 in this embodiment is preferably at least about 20 cm$^3$/m$^2$, more preferably at least about 30 cm$^3$/m$^2$, even more preferably at least about 40 cm$^3$/m$^2$, and most preferably at least about 50 cm$^3$/m$^2$. Intra-fiber pore related SPV2 in this embodiment is at least about 7 cm$^3$/m$^2$, resulting in a photopic reflectance of at least about 85%.

SPV2 is preferably at least about 16 cm$^3$/m$^2$, more preferably at least about 25 cm$^3$/m$^2$, even more preferably at least about 30 cm$^3$/m$^2$, and most preferably at least about 40 cm$^3$/m$^2$.

The photopic reflectance of nonwoven sheet diffuse reflectors according to the present invention was discovered to decrease with increased thermal bonding. Thermal bonding undesirably reduces the volume of nonwoven sheet intra-fiber pores having a high scattering cross section per unit pore volume that contribute substantially to the diffuse reflectance. Thermal bonding also undesirably reduces the volume of nonwoven sheet inter-fiber pores that also contribute to the diffuse reflectance. Thus, nonwoven sheet according to the present invention is preferably not thermal or otherwise bonded. Nonwoven sheet of the present invention is consolidated, and can contain a minimal degree of thermal or other bonding on the nonwoven sheet surface necessary to maintain the structural integrity of the sheet during diffuse reflective article or optical display assembly and use where consolidation of the nonwoven web alone is not sufficient.

The preferred embodiment plexifilamentary film-fibril polyolefin nonwoven sheets according to the present invention will have maximal volume of inter-fiber and intra-fiber pores, and thus high photopic reflectance, and maintain sufficient structural integrity during diffuse reflective article or optical display assembly and use, if bonding of the nonwoven sheet is carried out such that the bonded sheet has a delamination value of about 7.1 kg/m (0.4 lb/in) or less, preferably about 5.3 kg/m (0.3 lb/in) or less, more preferably about 5.0 kg/m (0.28 lb/in) or less, and most preferably about 1.8 kg/m (0.1 lb/in) or less. Delamination is a measurement reported in units of force/length (e.g., kg/m) defined by ASTM D 2724 and relates to the extent of bonding in certain types of sheet, for example bonding in nonwoven sheet made from plexifilamentary film-fibrils.

Surface area, as measured by the BET absorption method of S. Brunauer, P. H. Emmett and E. Teller in J. Am. Chem. Soc., v.60, pp. 309-319 (1938), is another physical property useful for characterizing high photopic reflectance nonwoven sheet of utility in diffuse reflectors according to the present invention. The present inventors discovered that the mathematical product of a nonwoven sheet BET surface area (m$^2$/g) and sheet basis weight (g/m$^2$), which is herein defined as the "area ratio", correlates to nonwoven sheet photopic reflectance of visible light. Nonwoven sheets according to the present invention will generally have a BET surface area of at least about 1.0 m$^2$/g, and can have a surface area as measured by the BET absorption method as high as 50 m$^2$/g and greater. Nonwoven sheets according to the present invention will generally have an area ratio of at least about 60. Preferred non-bonded (i.e., consolidated only) plexifilamentary film-fibril polyolefin nonwoven sheets according to the present invention will generally have an area ratio of at least about 600. However, in certain instances the BET surface area component of the area ratio will lead to poor correlation with nonwoven sheet photopic reflectance over the visible wavelength range. Such an instance occurs when there are a significant number of intra-fiber pores with mean pore diameter below the optimum visible light scattering feature dimension of slightly less than one-half the wavelength of the incident light. The present inventors found that a plot of specific pore volume (SPV) versus area ratio reveals that SPV increases in a logarithmic fashion with increase in area ratio. A plot of SPV1 versus area ratio results in a curve corresponding to the equation SPV1=23×(Ln(area ratio))−85 (R$^2$=0.92). A plot of SPV2 versus area ratio results in a curve corresponding to the equation SPV2=16×(Ln(area ratio))−58 (R$^2$=0.90). Comparison of a photopic reflectance (%) versus SPV (cm$^3$/m$^2$) plot to a photopic reflectance (%) versus area ratio plot reveals that SPV is the preferred parameter for predicting reflectivity of nonwoven sheets of utility in diffuse reflective articles according to the present invention, as photopic reflectance (%) varies more smoothly and predictably with SPV than with area ratio.

The scattering and diffuse reflection of light by nonwoven sheet diffuse reflectors is due to reflection of light at air-polymer interfaces of the inter-fiber and intra-fiber pores. Reflection will increase with an increase in the difference between the refractive index of the pore phase (air, refractive index of 1.0) and the refractive index of the fiber polymer phase. An increase in light scattering is observed typically when the difference in refractive index between two phases is greater than about 0.1. Polymer comprising the nonwoven sheet fibers of the present invention preferably has a high refractive index (for example polyethylene, refractive index of 1.51) and low absorption of visible light.

The diffuse reflectance exhibited by nonwoven sheet diffuse reflectors according to the present invention is a result of their high light scattering ability. However, high photopic reflectance of the nonwoven sheets is achieved by a combination of high light scattering ability together with very low absorption of visible light. One main negative impact of high light absorption by a nonwoven sheet is that the reflectance benefit afforded by higher sheet basis weight is greatly reduced. Thus, present nonwoven sheets have very low absorption of visible light and preferably do not absorb visible light. To avoid negative effects of light absorption it generally suffices to select as nonwoven sheet materials those having an absorption coefficient of visible light generally less than about 10$^{-4}$ µm$^1$, in particular generally less than about 10$^{-5}$ µm$^{-1}$. Polymers preferred for forming nonwoven sheet diffuse reflectors have an absorption coefficient of about 10$^{-4}$ m$^2$/g or less, preferably about 10$^{-5}$ m$^2$/g or less, and more preferably about 10$^{-6}$ m$^2$/g or less.

Reaching the proper white point in an LCD backlight can involve compensation in the phosphor mix in the light source to accommodate for losses in the backlight unit cavity associated with non-uniform spectral reflectivity. Preferred embodiment nonwoven sheet diffuse reflectors comprising plexifilamentary film-fibril polyolefin sheet have a surprisingly flat reflectivity curve over the visible wavelengths. The reflectivity curve of nonwoven sheet diffuse reflectors comprising plexifilamentary film-fibril polyolefin changes by less than about 4% reflectivity over the wavelength range of 380 nm to 780 nm. Thus, the reflected color of these nonwoven sheets tends to be more bluish than prior art diffuse reflectors and closer to neutral color balance due to their higher reflectivity below approximately 500 nm. This results in the reduction or elimination of the need for additional blue phosphor in the light source, which is typically added to offset the lower reflectivity of commercial reflectors below 500 nm. Thus, the present nonwoven sheet diffuse reflectors allow for the use of light sources having lower power consumption and heat generation resulting in longer light source life.

Diffusivity of reflected light is important to establishing luminance uniformity of LCD backlights. Line light sources such as cold-cathode fluorescent lamps (CCFLs) and point light sources such as red, green and blue light emitting diodes (RGB LEDs) are inherently not diffusive light sources. High diffusivity reflectors are desirable in direct-view backlights because their wider scattering angle leads to better luminance uniformity. Higher diffusivity is more critical for backlights where the CCFLs are more widely spaced apart and in backlights where a non-uniform color in the backlight needs to be addressed, such as backlights with RGB LED light sources. Further, many commercial backlight reflectors have a decreased blue reflectance which forces backlight manufacturers to consider methods to improve blue emission including fluorescent additives, higher blue emission (LED) and increased blue phosphor in the CCFL design. Such solutions have an associated drawback including reflectance stability (fluorescent additives) and decreased lifetime (increases blue LED and increased blue CCFL phosphor).

Preferred embodiment nonwoven sheet diffuse reflectors comprising plexifilamentary film-fibril polyolefin have highly diffuse reflectance. Typically, this corresponds to an average estimated angular bandwidth (ABW) at 70% of peak luminance of at least about 40 degrees. This is illustrated in example 17 and FIG. 10, which show that the diffuse reflectance of the present reflectors is higher than is available from commercial backlight reflectors. The wider diffusion cone exhibited by the present nonwoven sheet diffuse reflectors results in a wider scattering angle and therefore improved optical display uniformity. Higher diffuse reflectivity allows thinner backlight designs by using the wider diffusion cone to more effectively scatter light at high angles throughout the backlight unit. This characteristic of the present diffuse reflectors allows for the use of more transmissive diffuser plates resulting in higher utilization of light from the light source.

Nonwoven sheet diffuse reflectors can further comprise particulate filler dispersed in the polymer phase forming the nonwoven sheet fibers. Particulate fillers of utility will have a refractive index larger than the polymer and thus light scattering of the nonwoven sheet will increase with an increase in the difference between the refractive index of the pore phase (air, refractive index of 1.0) and the refractive index of the fiber polymer phase. Particulate fillers of utility have a high refractive index, high light scattering cross section and low absorption of visible light. Particulate filler enhances light scattering and thereby use of particulate filler can provide higher photopic reflectance for a given sheet thickness. Particulate fillers can be any shape and have a mean diameter of from about 0.01 µm to about 1 µm, preferably from about 0.2 µm to 0.4 µm. Nonwoven polymer sheets containing particulate filler comprise at least about 50% by weight polymer, and particulate filler comprises from about 0.05 weight % to about 50 weight %, preferably 0.05 weight % to about 15 weight %, based on the weight of the polymer. Example particulate fillers include silicates, alkali metal carbonates, alkali earth metal carbonates, alkali metal titanates, alkali earth metal titanates, alkali metal sulfates, alkali earth metal sulfates, alkali metal oxides, alkali earth metal oxides, transition metal oxides, metal oxides, alkali metal hydroxides and alkali earth metal hydroxides. Specific examples including titanium dioxide, calcium carbonate, clay, mica, talc, hydrotalcite, magnesium hydroxide, silica, silicates, hollow silicate spheres, wollastonite, feldspar, kaolin, magnesium carbonate, barium carbonate, magnesium sulfate, barium sulfate, calcium sulfate, aluminum hydroxide, calcium oxide, magnesium oxide, alumina, asbestos powder, glass powder and zeolite. Known methods are used to make the present nonwoven sheets containing particulate filler, such as those disclosed in U.S. Pat. No. 6,010,970 and PCT publication number WO2005/98,119.

Nonwoven sheet diffuse reflectors can further comprise ultraviolet (UV) stabilizer, which is a substance coating, or more preferably dispersed throughout the polymer phase of, the nonwoven sheet fibers to prevent photodeterioration by UV light. UV stabilizers work by absorbing UV radiation and prevent the formation of free radicals in the fiber polymer backbone, which can lead to undesirable chain fragmentation and degradation of polymer optical properties. Beneficial concentrations of UV stabilizer are from about 0.01 weight % to about 5.0 weight %, based on the weight of the polymer. Conventional UV stabilizers of known utility in plastics may be used, for example those from the groups benzophenones, hindered tertiary amines, benzotriazoles and hydroxyphenyl triazines. Commercial UV stabilizers of utility include the CHIMASSORB® and TINUVIN® families of stabilizers sold by Ciba Specialty Chemicals, Tarrytown, N.Y., USA.

Diffuse reflectors according to the present invention can comprise single or multiple layers of nonwoven sheets, such as laminates of two or more nonwoven sheets. This embodiment is particularly useful in obtaining diffuse reflectors having high photopic reflectance, for example, photopic reflectance of about 98% over the visible wavelength range. The multi-layer nonwoven sheet embodiment is also useful for averaging out nonuniformities in single nonwoven sheets due to nonuniform sheet thickness or directionality of sheet fibers. Nonwoven sheet laminates can be prepared by positioning two or more sheets face to face, and lightly thermally bonding the sheets under applied pressure, such as by rolling the sheets between one or more pairs of nip rollers. Laminates of nonwoven sheets are preferably prepared by adhering two or more sheets together with an adhesive, such as a pressure sensitive adhesive. Adhesives of utility are those that maintain sufficient structural integrity of the laminate during normal handling and use, for example liquid crystal display assembly and use. Adhesives are preferred to have thermal expansion properties similar to those of the nonwoven sheets, so that temperature variation does not lead to separation of the laminate by differential expansion. Adhesives of utility include moisture curable polyurethane, solvated polyurethane adhesives and water-borne acrylics. Preferred are known pressure-sensitive adhesives which are viscoelastic materials adhering instantaneously to the nonwoven sheet with the application of slight pressure and remaining permanently tacky. Especially useful are pressure sensitive adhesives containing additives such as tackifiers, which aid in adhering low surface energy materials such as polyolefin. Specific examples of adhesives of utility include NACOR® waterborne acrylic pressure-sensitive adhesives made by National Starch and Chemical Company, Bridgewater, N.J., USA, which have excellent optical clarity and are easily applied to nonwoven sheets by known coating methods such as flexographic printing and gravure coating.

Adhesives have a tendency to undesirably yellow with age. One way to mitigate the yellowing of adhesives is to apply the adhesive in a thinner layer. However, this can result in reduced strength of the laminate bond. Adhesives can be applied to a nonwoven sheet in a discontinuous or patterned (e.g., square grid) coating so that a relatively small fraction of the nonwoven sheet surface area is coated. This allows for the overall amount of adhesive to be reduced while keeping the thickness of the applied adhesive high allowing high laminate bond strength. A second method of mitigating the yellowing of adhesives is to formulate the adhesive to contain conventional ultraviolet (UV) screening additives and/or UV stabilizers, such as those disclosed earlier herein.

Thus, included in the present invention are diffuse reflective articles and optical displays containing a diffuse reflector comprising a nonwoven sheet laminate. Laminates include two nonwoven sheets with adhesive at the nonwoven sheet interface, the laminate having a total thickness of less than about 400 µm and a photopic reflectance over the wavelength range of visible light of at least about 96%. Laminates include three nonwoven sheets with adhesive at each nonwoven sheet interface, the laminate having a total thickness of less than about 600 µm and a photopic reflectance over the wavelength range of visible light of at least about 97%. Laminates include four nonwoven sheets with adhesive at each nonwoven sheet interface, the laminate having a total thickness of less than about 900 µm and a photopic reflectance over the wavelength range of visible light of at least about 98%.

Nonwoven sheet diffuse reflectors comprising a single nonwoven sheet have a nonwoven sheet thickness of from about 20 µm to about 1,000 µm, generally less than about 250 µm, and preferably from about 70 µm to about 150 µm. Nonwoven sheets having a thickness of about 250 µm and greater still exhibit useful and improved properties, such as flexibility, low cost, and high photopic reflectance, that make them desirable for use in place of competitive materials in applications requiring diffuse reflection of visible light. In nonwoven sheet laminates, the laminate thickness and therefore the diffuse reflector can be 1,000 μm or greater. Even though such a thickness may not be preferred in certain small optical display applications where space and diffuse reflector thickness is a premium (e.g., cell phones, hand held devices, and the like where thinner devices are preferred), such diffuse reflectors have definite utility in optical display applications where diffuse reflector thickness is less of a concern (e.g., larger flat panel LCD televisions and monitors, luminaires, copying machines, projection display light engines, integrating sphere uniform light sources, and the like).

Nonwoven sheet diffuse reflectors according to the present invention can comprise single or multiple layers, such as laminates of two or more, of nonwoven sheets with conventional diffuse reflector sheets. Conventional diffuse reflector sheets include white paper and filled and/o voided films, such as Lumirror® E60L, a polyester film, sold by Toray Industries, Inc., Chuo-ku, Tokyo, Japan. Conventional diffuse reflector sheets further include voided polymer films, such as those disclosed in U.S. Pat. No. 5,982,548. Laminates can be made with the aforementioned adhesives by conventional techniques.

Nonwoven sheet diffuse reflectors according to the present invention can further comprise backing support material to maintain the shape of the diffuse reflector during diffuse reflective article assembly and use. Such backing support material is positioned on the face of the diffuse reflector facing away from the light source. Backing support materials of utility include polyester films (e.g., Mylar®), aramid fiber (e.g., KEVLAR®), both available from E. I. du Pont de Nemours & Co., Wilmington, Del., USA, as well as paper, fabric or wovens, nonwoven sheets, foamed polymer, polymer films, metal foil or sheet and metallized film. Backing support material can be selected so as to increase the total reflectance of the diffuse reflector (e.g., metal foil or sheet and metallized film). Backing support material and nonwoven sheet may be laminated to one another with the aforementioned adhesives by conventional techniques. In addition, to create diffuse reflectors of complex shapes, diffuse reflectors of the present invention can be bonded to a rigid support material and then formed as a composite into shapes, such as parabolic or ellipsoidal domes.

Nonwoven sheets comprising diffuse reflectors according to the present invention can be surface roughened by corona and/or plasma treatment to assist adhering the nonwoven sheets to other materials. For example, such treatment aids adhesive lamination and results in better adhesion of a nonwoven sheet to other nonwoven sheets, backing support materials and specular reflectors.

Nonwoven sheet diffuse reflectors according to the present invention can further comprise a specular reflective layer positioned on the face of the nonwoven sheet facing away from the light source. Positioning a specular reflector as such increases the photopic reflectance of the diffuse reflector. In one embodiment, a face of a nonwoven sheet may be metallized. Representative metals include aluminum, tin, nickel, iron, chromium, copper, silver or alloys thereof, with aluminum preferred. Metals may be deposited by known vacuum metallization techniques in which metal is vaporized by heat under vacuum, and then deposited on one face of a nonwoven sheet in a thickness from about 75 angstroms to about 300 angstroms. Adhesion of such metallization layer is improved if the face of the nonwoven sheet to be metallized is lightly thermally bonded sufficient to provide a smoother surface upon which to coat the metal. Vacuum metallization of flashspun polyolefin sheet is known, for example in U.S. Pat. No. 4,999,222. In this embodiment, a thin specular reflecting layer is added to one face of the nonwoven sheet diffuse reflector without substantially changing the overall thickness of the nonwoven sheet. In another embodiment, the specular reflective layer comprises a metallized polymer sheet, for example aluminized MYLAR®, which can be laminated to a nonwoven sheet, with a metallized face of the metallized polymer sheet facing a face of the nonwoven sheet. In another embodiment, the specular reflective layer comprises a metal foil, for example aluminum foil, which can be laminated to a face of a nonwoven sheet, resulting in a stiffened diffuse reflector. Aluminum has a lower coefficient of thermal expansion than nonwovens, and is an extremely good thermal conductor. Both factors lead to minimization of temperature variations and therefore reduces the tendency for a present diffuse reflector to buckle under uneven heating encountered in LCDs with light sources comprising banks of tubular lights. The diffuse reflectors of this embodiment can be formed by laminating a metal foil to a nonwoven sheet using an aforementioned adhesive. In these embodiments where a diffuse reflector contains a metallized face or is laminated to a metallized polymer sheet or metal foil, the remaining (metal-free) face of the nonwoven sheet is positioned in the optical cavity facing the light source.

Light emitting diodes (LEDs) are useful light sources for small liquid crystal display (LCD) devices such as cell phones and hand held devices. LEDs provide the advantages of small size and lower energy consumption, but they have relatively low luminance. The optical efficiency of designs using LED illumination is increased when a nonwoven sheet diffuse reflector is used as a backreflector in combination with the aforementioned brightness enhancing and reflective polarizer films. LEDs can replace fluorescent lamps as the preferred backlight source for small LCDs such as cell phones, hand held devices, medical monitors and automotive displays. The advantage of using LEDs is their low price, small size and low energy consumption. The disadvantage of LEDs is their relatively low brightness. With the use of a nonwoven sheet diffuse reflector as a backreflector along with known specular reflective film layers, the brightness of LED displays can be increased.

The present invention further includes a method of improving light reflectivity in a device requiring diffuse reflectivity of light comprising: (i) providing a nonwoven sheet having a plurality of pores wherein the specific pore volume is at least about 34 $cm^3/m^2$ for pores having a mean pore diameter as measured by mercury porosimetry of from about 0.01 μm to about 1.0 μm; and (ii) positioning the nonwoven sheet within the device to cause light energy to reflect off of the nonwoven sheet.

EXAMPLES

Test Methods

Basis Weight

Basis weight is measured by the method of ASTM D 3776, modified for specimen size, and is reported in units of $g/m^2$.

Mercury Porosimetry

Nonwoven sheet pore size distribution data are obtained by known mercury porosimetry methodology as disclosed by H. M. Rootare in "A Review of Mercury Porosimetry" from Advanced Experimental Techniques in Powder Metallurgy, pp. 225-252, Plenum Press, 1970. "VP1" as hereinbefore defined is the volume of nonwoven sheet pores as measured by mercury porosimetry having a mean pore diameter of from 0.01 μm to 1.0 μm. "VP2" as hereinbefore defined is the volume of nonwoven sheet pores as measured by mercury porosimetry having a mean pore diameter of from 0.02 μm to 0.5 μm.

Specific Pore Volume

Specific pore volume (in units of cm$^3$/m$^2$, also referred to herein as "SPV") as hereinbefore defined is the mathematical product of the nonwoven sheet basis weight (in units of g/m$^2$) and the sheet pore volume (in units of cm$^3$/g) for pores of a given mean pore diameter range. SPV1 as hereinbefore defined is the specific pore volume relating to the VP1 mean pore diameter. SPV2 as hereinbefore defined is the specific pore volume relating to the VP2 mean pore diameter.

Thickness

Nonwoven sheet thickness measurements are made with an Ono Sokki EG-225 thickness gauge with a 0.95 cm (⅜inch) measurement probe affixed to a Ono Sokki ST-022 ceramic base gauge stand, both available from Ono Sokki, Addison, Ill., USA.

Delamination

Delamination values for bonded nonwoven sheets are obtained by the method of ASTM D2724, and reported in units of kg/m.

Reflectance Spectra

Total reflectance spectra of single nonwoven sheets and multi-nonwoven sheet constructions are obtained by the method of ASTM El 164-02 (Standard Practice for Obtaining Spectrophotometric Data for Object-Color Evaluation). A sheet is placed in a Lambda 650 UV/VIS/NIR Spectrometer with a 150 mm integrating sphere attachment, both available from PerkinElmer, Wellesley, Mass., USA. The output is a percent reflectance at each wavelength and the spectral range measured is 380 nm to 780 nm in 5 nm intervals. The reflectance standard is a calibrated SPECTRALON® standard purchased from LabSphere, North Sutton, N.H., USA. Photomultiplier detection is used. Tristimulus values are calculated by the method of ASTM E308-01 using the CIE 100 1964 standard observer and illuminant D65. The photopic reflectance, $R_{VIS}$, is calculated using illuminant D65 and the CIE Standard Photopic observer described in "Billmeyer and Saltzman Principles of Color Technology", 3$^{rd}$ Edition.

Examples 1-7, 18 and Comparative Example 1

Single Nonwoven Sheet

The example 1-7, 18 and comparative example 1 nonwoven sheets are single sheets of flash-spun high density polyethylene (HDPE) comprising a plurality of plexifilamentary film-fibrils of HDPE. The flash-spun HDPE sheets are produced by the general process disclosed in U.S. Pat. Nos. 3,081,519, 3,227,794 and 3,860,369.

The general process for producing the flash-spun HDPE sheets may be summarized as three steps. Step one is spinning. A solution of high density polyethylene (HDPE) with either CFC-11 (fluorotrichloromethane) or C-5 hydrocarbons is subjected to two pressure reductions; the first results in a two-phase liquid solution and the second, to atmospheric pressure results in the flash evaporation of the non-polymer component leaving an interconnected web of solid HDPE. A series of webs are collected on a paper machine and wound into rolls.

Step 2 is thermal area bonding. The rolled webs are unwound and each web surface is heated to a temperature slightly below, typically in the range of 3° C. to 8° C. below, the polymer melting point while applying force normal to the face of the sheet resulting in the stable sheet surfaces. This is done on large diameter steam heated drums. To prevent the sheet from shrinking excessively, a blanket holds the sheet against the drum surface effectively restraining it. Each sheet surface is cooled by contact with a chilled drum immediately after leaving the steam heated drum. After thermal bonding the sheet may be corona treated on none, one or both sides and have antistat agent applied to none, one or both sides. The product is them wound into rolls again.

Step 3 is the slitting step. The product is slit to a desired width and wound into the rolls of the desired length.

The main differences between the processes used to produce the example 1-7, 18 and comparative example 1 sheets are i) basis weight, which is determined only by the spinning line speed, ii) degree of bonding, which is determined by the product weight, bonder speed and bonding drum temperature, and iii) if the sheet is corona treated and/or coated with an antistat agent.

Table 1 reports sheet average thickness (μm), thickness standard deviation (μm), sheet basis weight (g/m$^2$), whether or not the sheet is thermal area bonded, average $R_{VIS}$ (%), sheet delamination value (kg/m), VP1 (cm$^3$/g), VP2 (cm$^3$/g), SPV1 (cm$^3$/m$^2$) and SPV2 (cm$^3$/m$^2$) for seven single flash-spun HDPE sheets useful in present diffuse reflectors. Table 2 reports like data for a comparative single flash-spun HDPE sheet.

Multiple (i.e., at least twelve) 34 mm×34 mm square flash-spun HDPE sheet samples are cut from different areas of a continuous sheet. The thickness of each sheet sample is measured by the aforementioned method and averaged by the number of sheet samples to determine an average thickness of each nonwoven sheet. Basis weight of each sheet sample is determined by the aforementioned method and averaged by the number of sheet samples to determine an average basis weight of each nonwoven sheet. Whether or not a sheet is thermal area bonded is recorded in Table 1. A total reflectance spectrum is obtained for each sheet sample by the aforementioned method and the $R_{VIS}$ value calculated. The sheet sample spectra are averaged to determine an average reflectance spectrum and average $R_{VIS}$ for each sheet. The delamination value for each flash-spun HDPE sheet is measured by the aforementioned method. VP1 and VP2 of each sheet are determined by the aforementioned mercury porosimetry method. Specific pore volumes SPV1 and SPV2 are calculated as previously described.

Table 1 reports the results.

TABLE 1

Examples - Single Flash-Spun Polyethylene Sheet

| Ex. No. | FIG. No. | Average Thickness (μm) | Thickness Standard Deviation (μm) | Basis Weight (g/m$^2$) | Thermally Bonded | Average $R_{VIS}$ (%) | Delamination (kg/m) | VP1 (cm$^3$/g) | VP2 (cm$^3$/g) | SPV1 (cm$^3$/m$^2$) | SPV2 (cm$^3$/m$^2$) |
|---|---|---|---|---|---|---|---|---|---|---|---|
| 1 | 4 | 339 | 24 | 93 | No | 97.5 | <1 | 1.17 | 0.81 | 109 | 76 |
| 2 | 4, 7 | 273 | 32 | 76 | No | 96.2 | <1 | 0.94 | 0.63 | 71 | 48 |
| 3 | 4 | 279 | 31 | 95 | Yes | 95.5 | 5.0 | 0.70 | 0.53 | 67 | 50 |
| 4 | 4, 7 | 210 | 19 | 70 | Yes | 94.0 | 5.2 | 0.55 | 0.41 | 39 | 29 |
| 5 | 4 | 179 | 25 | 58 | Yes | 93.2 | 4.6 | 0.61 | 0.45 | 35 | 26 |
| 6 | 4 | 133 | 29 | 43 | Yes | 90.5 | 5.0 | 0.65 | 0.49 | 28 | 21 |

TABLE 1-continued

Examples - Single Flash-Spun Polyethylene Sheet

| Ex. No. | FIG. No. | Average Thickness (μm) | Thickness Standard Deviation (μm) | Basis Weight (g/m$^2$) | Thermally Bonded | Average $R_{VIS}$ (%) | Delamination (kg/m) | VP1 (cm$^3$/g) | VP2 (cm$^3$/g) | SPV1 (cm$^3$/m$^2$) | SPV2 (cm$^3$/m$^2$) |
|---|---|---|---|---|---|---|---|---|---|---|---|
| 7 | 4 | 194 | 19 | 73 | Yes | 87.2 | 7.5 | 0.18 | 0.13 | 13 | 10 |
| 18 | — | 283 | 17 | 104 | Yes | 96.2 | 5.0 | 0.51 | 0.39 | 53 | 40 |

TABLE 2

Comparative Example - Single Flash-Spun Polyethylene Sheet

| Ex. No. | FIG. No. | Average Thickness (μm) | Thickness Standard Deviation (μm) | Basis Weight (g/m$^2$) | Thermally Bonded | Average $R_{VIS}$ (%) | Delamination (kg/m) | VP1 (cm$^3$/g) | VP2 (cm$^3$/g) | SPV1 (cm$^3$/m$^2$) | SPV2 (cm$^3$/m$^2$) |
|---|---|---|---|---|---|---|---|---|---|---|---|
| C1 | 4, 7 | 165 | 31 | 61 | Yes | 84.9 | 7.5 | 0.15 | 0.10 | 9 | 6 |

Figure 7:
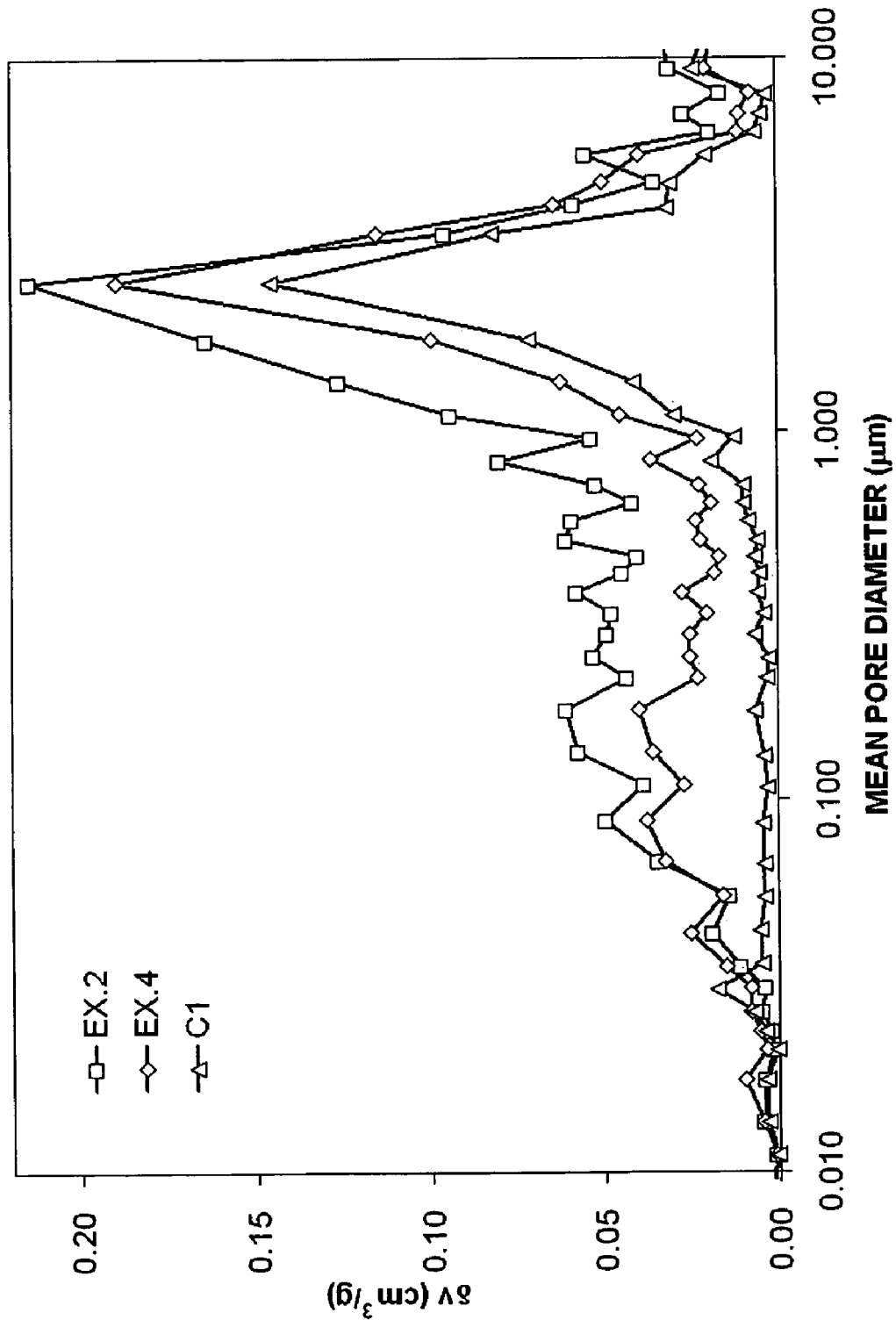
FIG. 7 is a graph of differential pore volume (6v (cm$^3$/g)) versus mean pore diameter (µm) obtained from mercury porosimetry of nonwoven sheets utilized in diffuse reflectors according to the present invention.

FIG. 4 is a graph of total reflectance spectra (reflectivity (%) versus wavelength (nm)) for the flash-spun HDPE sheets of examples 1-7 and flash-spun HDPE sheet of comparative example 1 (C1). FIG. 7 is a graph of differential pore volume (δv (cm$^3$/g)) versus mean pore diameter (μm) obtained by mercury porosimetry performed on the flash-spun HDPE sheets of examples 2, 4 and comparative example 1 (C1). FIG. 8 is a graph of average $R_{VIS}$ (%) versus SPV1 and SPV2 (cm$^3$/m$^2$) for example 1-7 flash-spun HDPE sheets.

Examples 8-9

Multilayer Nonwoven Sheets

Table 3 reports basis weight (g/m$^2$) and average $R_{VIS}$ (%) for example multi-layer flash-spun HDPE sheets comprising present diffuse reflectors. These examples follow the procedure and use materials described in examples 1-7 and 18, except where stated otherwise.

Square flash-spun HDPE sheet samples 34 mm by 34 mm are cut from different areas of a continuous example 4 sheet. The sheet samples are combined into eight, two-layer constructions comprising two nonwoven sheet samples positioned face-to-face, and eight, three-layer constructions comprising three nonwoven sheet samples positioned face-to-face. For reflectivity measurements, these multi-layer constructions are not laminated with adhesive, but are held with a spring-loaded sample holder which maintains the sheets in intimate physical contact.

Table 3 reports the results.

TABLE 3

Multi-layer Flash-spun HDPE Sheets

| Ex. No. | Sheet Identification | Basis Weight (g/m$^2$) | Average $R_{VIS}$ (%) |
|---|---|---|---|
| 8 | 2 layers of EX. 4 sheet | 140 | 96.5 |
| 9 | 3 layers of EX. 4 sheet | 209 | 97.1 |

Example 10

Single Nonwoven Sheet Backed With Aluminized Mylar® Film

Average thickness (μm), thickness standard deviation (μm) and average $R_{VIS}$ (%) for an example diffuse reflector comprising a single layer flash-spun HDPE sheet backed with an aluminized film are reported here. This example follows the procedure and use materials described in examples 1-7 and 18, except where stated otherwise.

A 50 μm thick aluminized MYLAR® sheet is used as a specular reflector behind a single layer of example 4 flash-spun HDPE sheet. MYLAR 200D polyester film (manufactured by DuPont Teijin Films, Hopewell, Va., USA) is coated on one face with a heavy (high optical density/low resistivity) evaporated aluminum coating by Courtalds Performance Films in Martinsville, Va. A 34 mm×34 mm sample is cut from the aluminized MYLAR film and a total reflectance spectrum is measured on this sample, presented in FIG. 5.

Fifteen 34 mm×34 mm square flash-spun HDPE sheet samples are cut from different areas of example 4 sheet. A single flash-spun HDPE sheet sample is positioned face-to-face with a single aluminized MYLAR sheet such that the metallized face of the MYLAR sheet contacts a face of the flash-spun HDPE sheet, with the remaining polyethylene face of the flash-spun HDPE sheet facing the light source during reflectance measurements. For reflectivity measurements, this multi-layer construction is not laminated with adhesive, but is held with a spring-loaded sample holder which maintains the sheets in intimate physical contact. A total reflectance spectrum is obtained for each of the flash-spun HDPE sheet and aluminized MYLAR constructions by the aforementioned method and the $R_{VIS}$ value calculated. The spectra are averaged to determine an average reflectance spectrum and an average $R_{VIS}$ of 95.7%. The thickness of each flash-spun HDPE sheet and aluminized MYLAR construction is measured at multiple points by the aforementioned method and all measurements averaged. The average thickness of the flash-spun HDPE sheet and aluminized MYLAR construction is 270 μm and the thickness standard deviation is 19 μm.

Figure 5:
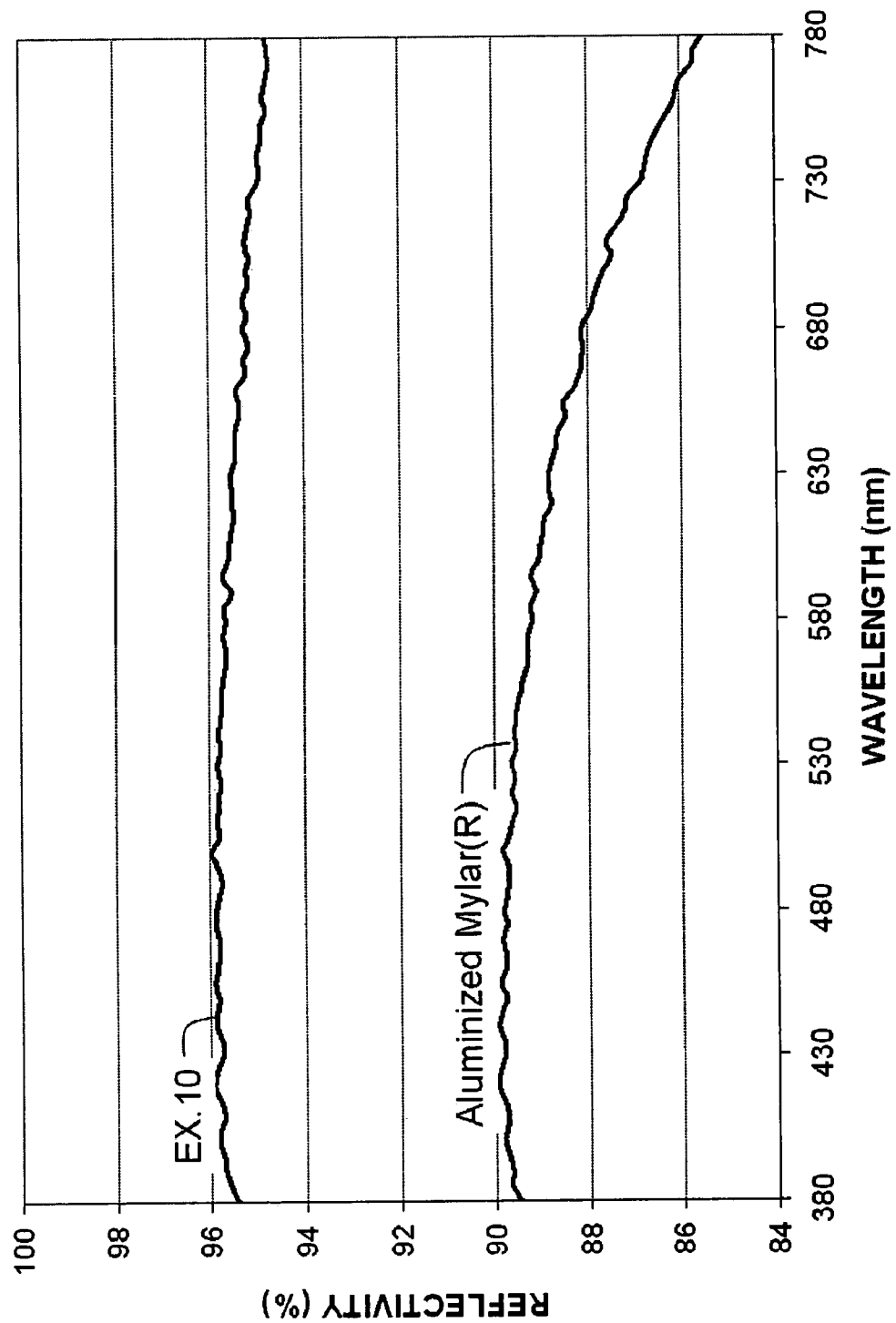
FIG. 5 is a graph of reflectivity (%) versus wavelength (nm) for a nonwoven sheet and aluminized Mylar® construction utilized in diffuse reflectors according to the present invention.

FIG. 5 is a graph of total reflectance spectra (reflectivity (%) versus wavelength (nm)) for the flash-spun HDPE sheet and aluminized MYLAR construction of example 10 and the aluminized MYLAR sheet used in the example 10 construction.

Examples 11-14

Multilayer Nonwoven Sheet Laminates

Average thickness (μm), thickness standard deviation (μm) and average $R_{VIS}$ (%) for example diffuse reflectors comprising multi-layer flash-spun HDPE sheet laminates are reported here. These examples follow the procedure and use materials described in examples 1-7 and 18, except where stated otherwise.

Multilayer flash-spun HDPE sheet laminates are made of two, three or four layers of example 3 and example 4 sheet with Nacor® 38-033A water-based pressure sensitive adhesive (available from National Starch of Bridgewater, N.J., USA) at each flash-spun HDPE sheet interface. Each laminate is approximately 30.5 cm (twelve inches) square. The adhesive is applied using a #14 wire wound rod available from the Paul N. Gardner Company, Pompano Beach, Fla., USA. For all laminates, adhesive is applied to one flash-spun HDPE sheet face and allowed to dry before the sheet is laminated.

For the two and three-layer laminates, fourteen approximately 34 mm×34 mm square laminate samples are cut from a larger laminate. A total reflectance spectrum is obtained for each sample and $R_{VIS}$ calculated. The spectra is then averaged to determine an average reflectance spectra and average $R_{VIS}$ for the two and three-layer laminates. For the four-layer laminate, six approximately 34 mm×34 mm square laminate samples are cut from a larger laminate. A total reflectance spectrum is obtained for each sample and $R_{VIS}$ calculated. The spectra are averaged to determine an average reflectance spectra and average $R_{VIS}$ for the four-layer laminate.

Table 5 reports the results.

TABLE 5

Flash-spun HDPE Sheet Laminates

| EX. No. | FIG. No. | Laminate | Laminate Average Thickness (μm) | Thickness Standard Deviation (μm) | Average $R_{VIS}$ (%) |
|---|---|---|---|---|---|
| 11 | 6 | 2 layers of EX. 4 sheet | 385 | 43 | 96.2 |
| 12 | 6 | 3 layers of EX. 4 sheet | 569 | 39 | 97.1 |
| 13 | 6 | 4 layers of EX. 4 sheet | 772 | 39 | 98.2 |
| 14 | 6 | 2 layers of EX. 3 sheet | 568 | 34 | 97.5 |

Figure 6:
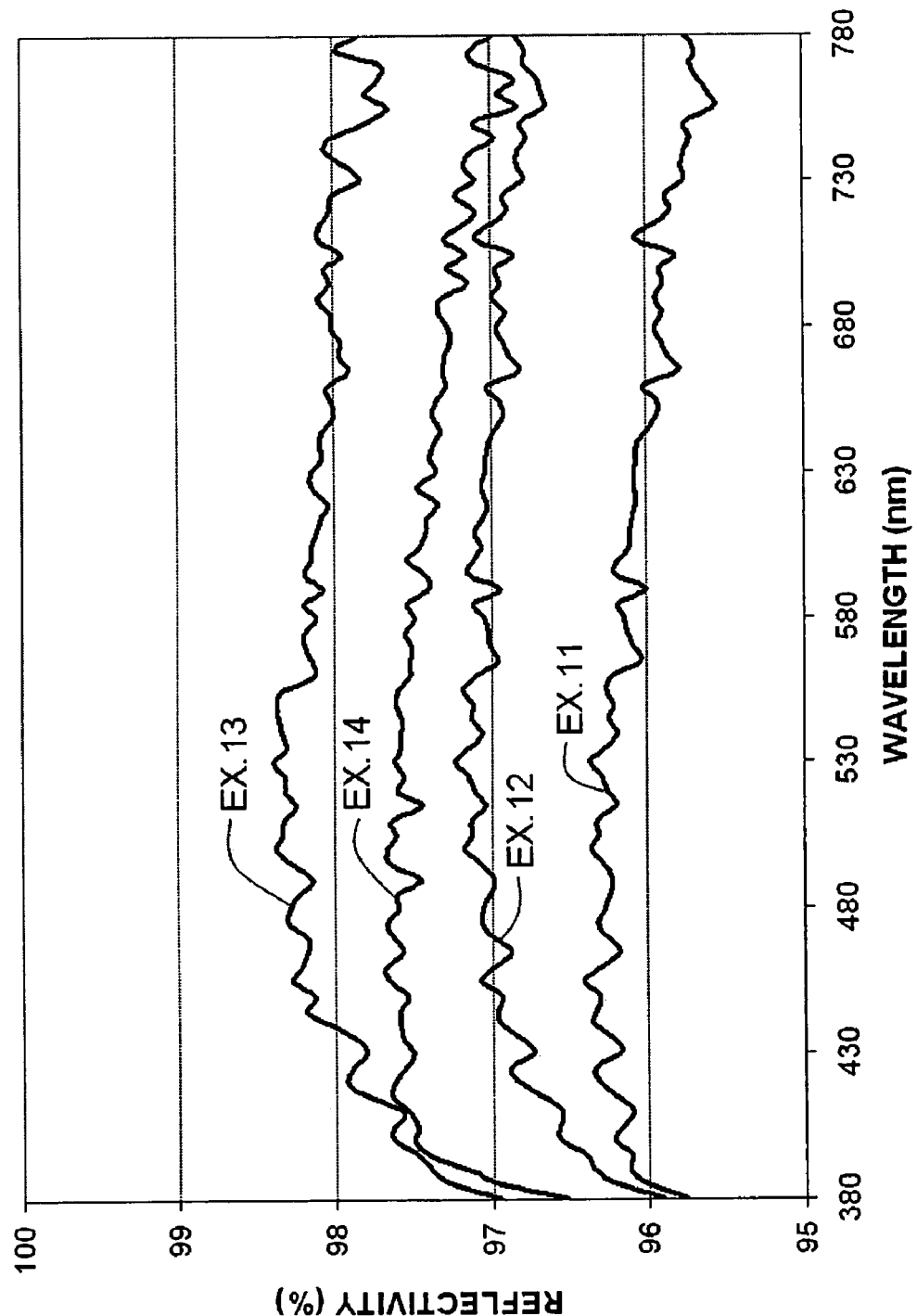
FIG. 6 is a graph of reflectivity (%) versus wavelength (nm) for nonwoven sheet laminates utilized in diffuse reflectors according to the present invention.

FIG. 6 is a graph of total reflectance spectra (reflectivity (%) versus wavelength (nm)) for the flash-spun HDPE sheet laminates of examples 11-14.

Example 15

Direct View Backlight Having Multi-Layer Nonwoven Sheet Reflector

In examples 15 and 16, liquid crystal optical display backlights are prepared with multi-layer nonwoven sheet diffuse reflectors according to the present invention and compared to the same backlight containing commercially available diffuse reflectors. Use of nonwoven sheet diffuse reflectors demonstrates increased brightness which could be translated to longer display battery life at the original display brightness.

Table 6 reports average luminance (cd/m²), luminance standard deviation (cd/m², referred to herein as "sd") and uniformity (%, defined as sd/average luminance) for a commercial backlight unit containing a single flash-spun HDPE sheet laminate diffuse reflector described in examples 11 and 13, or either of the single commercial reflectors MCPET and E6SV.

Figure 9:
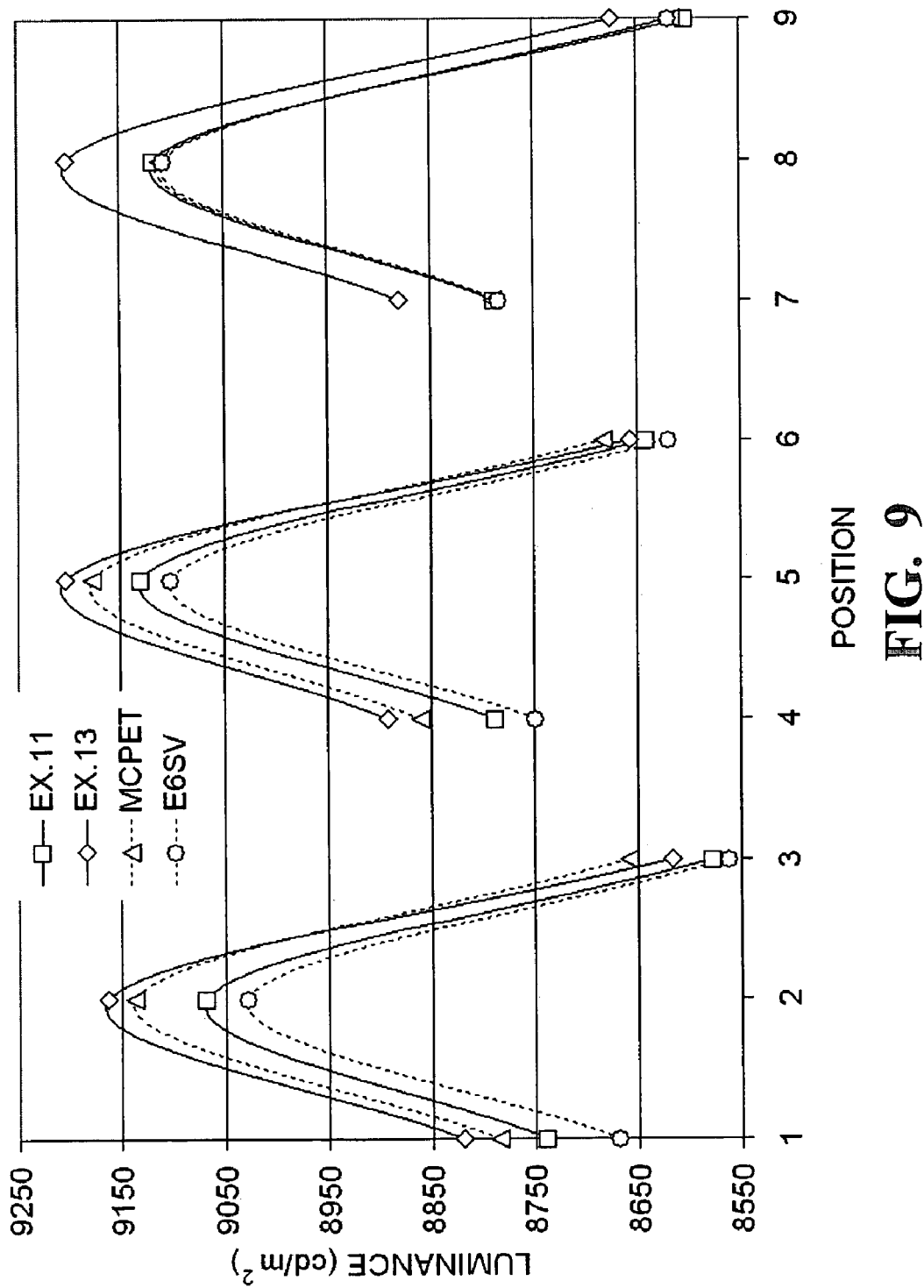
FIG. 9 is a graph of luminance (cd/m$^2$) versus measurement position for a backlight unit containing diffuse reflectors according to the present invention.

A 33 cm (13") LCD television, model LC-13AV1U from Sharp Electronics Corporation, N.J., USA, is disassembled to obtain its backlight unit comprising a reflector sheet, two white injection molded end pieces, four U-shaped cold cathode fluorescent lamps, and a diffuser plate. The front surface of the backlight unit measures 220 mm by 290 mm. A black absorbing film is positioned over and completely covers the bottom portion of the existing reflector during testing of nonwoven reflectors according to the present invention to avoid the contribution to light reflection from the existing reflector in that area. Example 11 (two layer) and example 13 (four layer) multi-layer laminates are produced by the aforementioned process in a size to fit the entire bottom face of the backlight unit cavity. A single multi-layer laminate reflector is then positioned in the backlight unit on top of the black absorbing film. The sidewalls of the backlight cavity are not modified. The performance of the backlight containing the single multi-layer laminate is measured using a Photo Research®, Inc., Chatsworth, Calif., USA, PR®-650 SpectraScan® colorimeter. Luminance (cd/m²) is measured with the calorimeter at nine points across the front surface of the backlight unit at spacings of 70, 140 and 210 mm in horizontal dimensions and 67,108 and 166 mm in vertical direction measured using the lower left hand corner of the backlight unit as the origin. Average luminance and uniformity are measured and compared to like measurements made on samples of individual commercial reflectors positioned in the backlight unit as described. The commercial reflectors examined are "MCPET", an ultra-fine foam glass light reflection panel manufactured by Furukawa Electric Co., Ltd., Chiyoda-ku, Tokyo, Japan, and "E6SV", a 255 μm thick White PET reflector sold by Toray Industries, Inc. of Chiba, Japan. Luminance versus measurement position for the backlight unit containing each individual reflector is shown in FIG. 9.

Average luminance and uniformity (sd/svg) for the backlight unit containing single non-woven reflectors of example 11, example 13, MCPET or E6SV is summarized in Table 6.

TABLE 6

| | Reflector | | | |
|---|---|---|---|---|
| | EX. 11 | EX. 13 | MCPET | E6SV |
| Average Luminance (cd/m²) | 8828 | 8901 | 8869 | 8804 |
| sd | 221 | 237 | 219 | 218 |
| sd/avg | 2.6% | 2.7% | 2.5% | 2.5% |

Example 16

Direct View Backlight Having Multi-Layer Nonwoven Sheet Reflector

Table 7 reports average luminance (cd/m²), luminance standard deviation (cd/m², referred to herein as "sd") and uniformity (%, defined as sd/average luminance) for a commercial backlight unit containing a single flash-spun HDPE sheet laminate diffuse reflector described in examples 11, 12 and 13, or a single commercial reflector.

Figure 10:
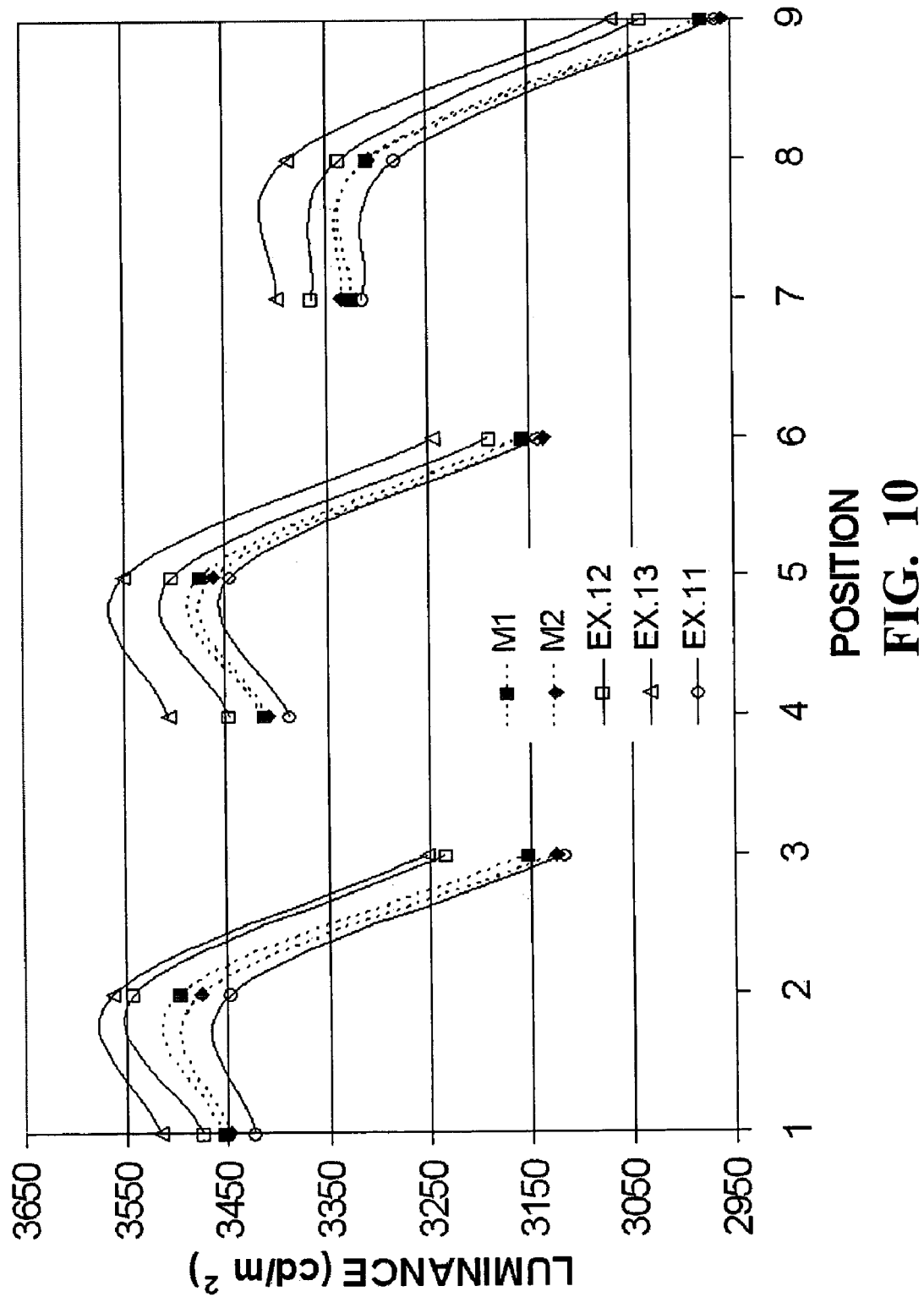
FIG. 10 is a graph of luminance (cd/m$^2$) versus measurement position for a backlight unit containing diffuse reflectors according to the present invention.

A 50.8 cm (20") LCD television, model LC-20C7-S from Sharp Electronics Corporation, N.J., USA, is disassembled to obtain its backlight unit comprising a reflector sheet, two white injection molded end pieces, five U-shaped cold cathode fluorescent lamps, and a diffuser plate, diffuser sheet and diffuser reflective polarizer (Vikuiti™ DBEF-D film available from 3M, Minn., USA). The front surface of the backlight unit measures 330 mm by 440 mm. Non-woven reflectors are cut and formed into the same size and shape as the existing reflector and their performance is compared to the exisiting reflector by substitution directly into the backlight unit with no further modification. Example 11 (two layer), example 12 (three layer), and example 13 (four layer) laminates are produced by the aforementioned process in a size to fit the entire face of the backlight unit. The white injection molded endpieces of the backlight cavity are not modified. The performance of the backlight is measured using a Photo Research®, Inc., Chatsworth, Calif., USA, PR®-650 SpectraScan® colorimeter. Luminance is measured at nine points across the front surface of the backlight unit at spacings of 76, 220 and 365 mm in horizontal dimensions and 58, 164 and 271 mm in vertical direction measured using the lower left hand corner of the backlight unit as origin. Average luminance and uniformity are measured and compared to the backlight unit containing only the existing reflector as obtained in the LCD television from the manufacturer. The existing reflector is a white filled polyester film and the performance of the backlight containing this film was measured before (measurement #1, "M1" on FIG. 9) and after (measurement #2, "M2" on FIG. 9) the measurement of the example 11-13 laminate reflectors. Luminance versus measurement position for the backlight unit containing each individual reflector is shown in FIG. 10.

Average luminance and uniformity (sd/svg) for the backlight unit containing single non-woven reflectors of examples 11, 12 or 13, or the existing reflector is summarized in Table 7.

TABLE 7

| Reflector | Existing Reflector, Measurement #1 | Existing Reflector, Measurement #2 | EX. 11 | EX. 12 | EX. 13 |
|---|---|---|---|---|---|
| Average Luminance (cd/m$^2$) | 3306 | 3295 | 3280 | 3347 | 3387 |
| sd | 177 | 182 | 171 | 166 | 169 |
| sd/avg | 5.4% | 5.5% | 5.2% | 5.0% | 5.0% |

Example 17

Diffuse Reflectance From Multi-Layer Nonwoven Sheet Reflectors

Table 8 reports the angular bandwdith (ABW) at 70% of peak luminance for single flash-spun HDPE sheet laminate diffuse reflectors described in examples 11, 12 and 13, as well as the commercial reflectors E60L, E6SV (both are white PET reflectors sold by Toray Industries, Inc. of Chiba, Japan) and MCPET (an ultra-fine foam glass light reflection panel manufactured by Furukawa Electric Co., Ltd., Chiyoda-ku, Tokyo, Japan).

Figure 11:
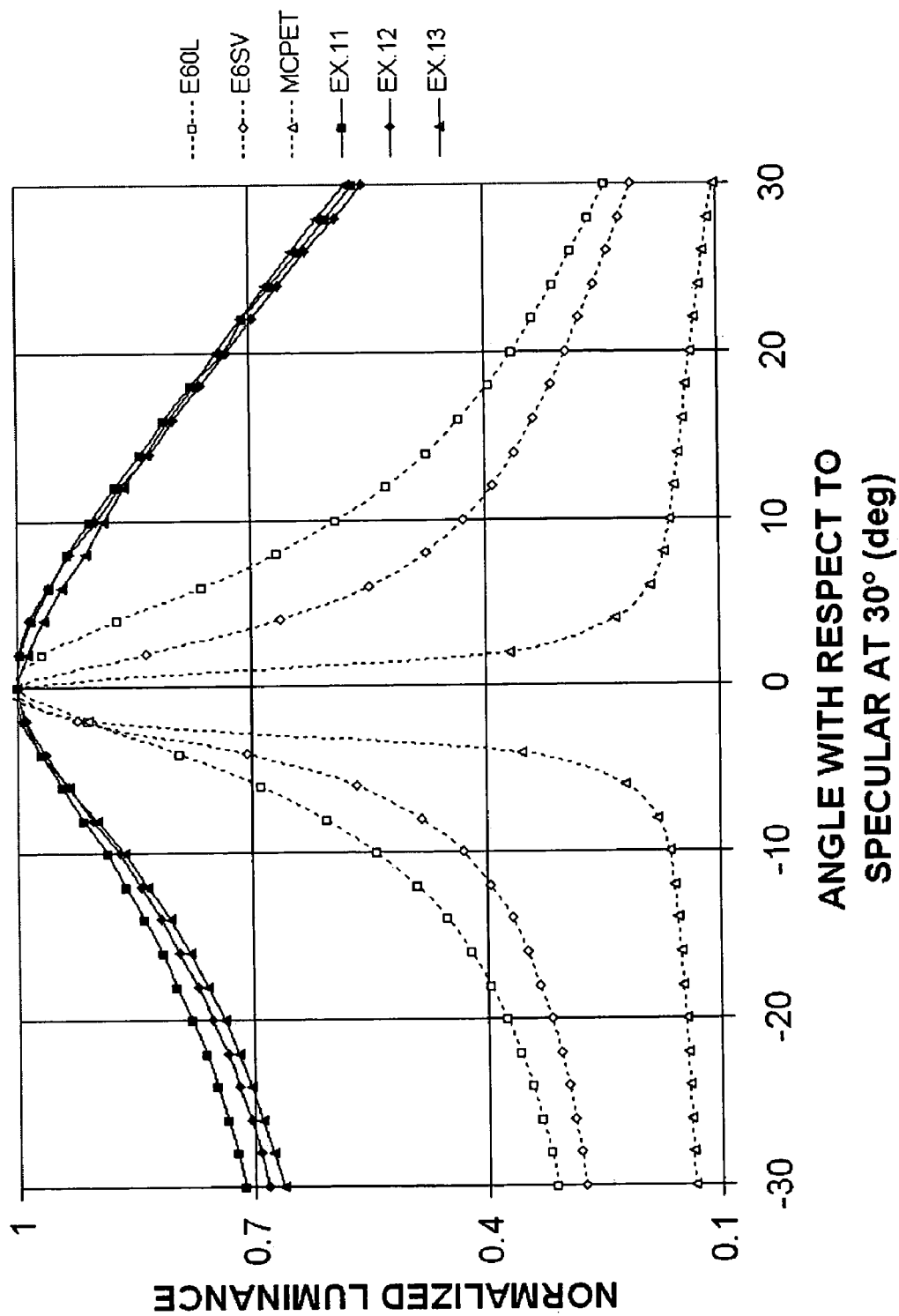
FIG. 11 is a graph of normalized luminance versus angle with respect to specular at 300 (deg) for diffuse reflectors according to the present invention.

The reflectance of light incident on single flash-spun HDPE sheet laminate diffuse reflectors and commercial reflectors is measured using a collimated light illuminating the sample at a fixed angle of 30 degrees from normal to the reflector plane. The reflectance is measured using a Photo Research®, Inc., Chatsworth, Calif., USA, PR®-650 SpectraScan® calorimeter. The diffusivity of the reflector is quantified from this measurement. Example 11 (two layer), example 12 (three layer), and example 13 (four layer) laminates are produced by the aforementioned process in a size of 50 mm by 50 mm. Samples of E60L, E6SV and MCPET of the same size are also produced. These samples are mounted on a stage and the luminance measured over an angular range of −30 degrees to +30 degrees from the specular reflectance angle of 30 degrees from normal to the reflector plane on the opposite side from the illumination angle. The performance of these reflectors is shown in Table 8 where the angular bandwidth (ABW) at 70% of peak luminance is determined for all reflectors and the dependence of the normalized luminance on reflected angle, a measure of the diffusion cone for the reflector, is plotted for these reflectors in FIG. 11.

TABLE 8

| Reflector | −deg ABW at 70% peak luminance (deg) | +deg ABW at 70% peak luminance (deg) | Average ABW at 70% peak luminance (deg) |
|---|---|---|---|
| E60L | 12 | 14 | 13 |
| E6SV | 8 | 6 | 7 |
| MCPET | 6 | 2 | 4 |
| EX. 11 | 64 | 44 | 54 |
| EX. 12 | 52 | 44 | 48 |
| EX. 13 | 48 | 46 | 47 |

What is claimed is:

1. A diffuse reflective article comprising a diffuse reflector of light positioned within a structure defining an optical cavity, wherein said diffuse reflector comprises a nonwoven sheet comprising fibers and inter-fiber pores, and containing a plurality of pores, wherein the specific pore volume is at least 34 cm$^3$/m$^2$ for the plurality of pores having a mean pore diameter as measured by mercury porosimetry of from 0.01 μm to 1.0 μm.

2. The article of claim 1, further comprising: (i) a light source positioned within said optical cavity; and (ii) a display panel through which light from said light source passes, wherein said diffuse reflector is positioned within said optical cavity for reflecting light from said light source toward said display panel.

3. The article of claim 2, wherein said structure is a sign cabinet comprising walls, wherein at least a portion of one of said walls is lined with said diffuse reflector.

4. The article of claim 3 wherein said fibers are flash-spun fibers.

5. The article of claim 2, wherein said structure is a luminaire comprising walls, wherein at least a portion of one of said walls is lined with said diffuse reflector.

6. The article of claim 5 wherein said fibers are flash-spun fibers.

7. The article of claim 2, wherein said diffuse reflector lines at least a portion of said optical cavity facing said light source.

8. The article of claim 2, wherein said display panel is a liquid crystal optical display.

9. The article of claim 2, wherein said diffuse reflector lines at least a portion of said optical cavity and partially wraps around said light source so as to direct light from said light source into said optical cavity.

10. The article of claim 9, wherein said optical cavity includes a light guide.

11. The article of claim 10, wherein said diffuse reflector reflects light from said light source into said light guide.

12. The article of claim 2 wherein said fibers are spunbond fibers or melt blown fibers.

13. The article of claim 2 wherein said fibers are flash-spun fibers.

14. The article of claim 1 wherein said specific pore volume is at least about 40 cm$^3$/m$^2$.

15. The article of claim 1 wherein the specific pore volume is at least 28 cm$^3$/m$^2$ for a second plurality of pores having a mean pore diameter as measured by mercury porosimetry of from 0.02 μm to 0.5 μm.

16. The article of claim 15 wherein said specific pore volume for the second plurality of pores is at least 30 cm³/m².

17. The article of claim 1, wherein the average thickness of said nonwoven sheet is from about 20 µm to 250 µm.

18. The article of claim 1, wherein said nonwoven sheet comprises a plurality of plexifilamentary film-fibrils, wherein said fibrils comprise polymer containing pores.

19. The article of claim 18, wherein said polymer has an absorption coefficient of about $10^{-4}$ m²/g or less.

20. The article of claim 18, wherein said polymer is at least one polymer selected from the group consisting of polyester, polyolefin, perfluoropolymer, hydrofluoropolymer, acetal, polycarbonate and polysulfone.

21. The article of claim 18, wherein said polymer comprises polyolefin.

22. The article of claim 21, wherein said polyolefin comprises polyethylene.

23. The article of claim 22, wherein said polyethylene is a linear high density polyethylene which has an upper limit of melting range of about 130° to 137° C., a density in the range of 0.94 to 0.98 g/cm³ and a melt index as defined by ASTM D-1238-57T, Condition F, of between 0.1 to 100.

24. The article of claim 18 wherein said fibers are spunbond fibers or melt blown fibers.

25. The article of claim 18 wherein said fibers are flash-spun fibers.

26. The article of claim 18 wherein said fibers are flash-spun fibers.

27. The article of claim 1, wherein the reflectivity of said nonwoven sheet changes by no more than about 4% reflectivity over the wavelength range of 380 nm to 780 nm.

28. The article of claim 1, wherein said nonwoven sheet comprises polymer, said polymer further comprising from about 0.01 to about 5.0 weight percent ultraviolet stabilizer, based on the weight of said polymer.

29. The article of claim 1, wherein said nonwoven sheet comprises polymer, said polymer further comprising from about 0.05 to about 50 weight percent particulate filler based on the weight of said polymer.

30. The article of claim 1, wherein at least one face of said nonwoven sheet has been subjected to at least one treatment selected from the group consisting of corona treatment and plasma treatment.

31. The article of claim 1, further comprising a backing support material laminated to said nonwoven sheet.

32. The article of claim 31 wherein said fibers are flash-spun fibers.

33. The article of claim 1, further comprising a specular reflective layer on one face of said nonwoven sheet.

34. The article of claim 33 wherein said specular reflective layer comprises a metalized polymer sheet or metal foil.

35. The article of claim 33 wherein said fibers are flash-spun fibers.

36. The article of claim 1, wherein said diffuse reflector comprises a laminate of a plurality of layers of nonwoven sheet.

37. The article of claim 36, wherein said laminate comprises two layers of nonwoven sheet and adhesive, the average thickness of said diffuse reflector is less than about 400 µm, and the photopic reflectance of said diffuse reflector over the wavelength range of 380 nm to 780 nm is at least about 96%.

38. The article of claim 36, wherein said laminate comprises three layers of nonwoven sheet and adhesive, the average thickness of said diffuse reflector is less than about 600 µm, and the photopic reflectance of said diffuse reflector over the wavelength range of 380 nm to 780 nm is least about 97%.

39. The article of claim 36, wherein said laminate comprises four layers of nonwoven sheet and adhesive, the average thickness of said diffuse reflector is less than about 900 µm, and the photopic reflectance of said diffuse reflector over the wavelength range of 380 nm to 780 nm is at least about 98%.

40. The article of claim 36 wherein said fibers are flash-spun fibers.

41. The article of claim 1 wherein said fibers are spunbond fibers or melt blown fibers.

42. The article of claim 1 wherein said fibers are flash-spun fibers.

43. An optical display, comprising:
   (i) a structure defining an optical cavity;
   (ii) a light source positioned within said optical cavity;
   (iii) a display panel through which light from said light source passes; and
   (iv) a diffuse reflector positioned within said optical cavity for reflecting light from said light source toward said display panel, wherein said diffuse reflector comprises a nonwoven sheet comprising fibers and inter-fiber pores and containing a plurality of pores, wherein the specific pore volume is at least about 10 cm³/m² for the plurality of pores having a mean pore diameter as measured by mercury porosimetry of from about 0.01 µm to about 1.0 µm.

44. The optical display of claim 43 wherein said specific pore volume is at least about 20 cm³/m².

45. The optical display of claim 43 wherein said specific pore volume is at least about 30 cm³/m².

46. The optical display of claim 43 wherein said specific pore volume is at least about 40 cm³/m².

47. The optical display of claim 43 wherein said specific pore volume is at least about 50 cm³/m².

48. The optical display of claim 43 wherein the specific pore volume is at least about 7 cm³/m² for a second plurality of pores having a mean pore diameter as measured by mercury porosimetry of from about 0.02 µm to about 0.5 µm.

49. The optical display of claim 48 wherein said specific pore volume for the second plurality of pores is at least about 25 cm³/m².

50. The optical display of claim 49, wherein said nonwoven sheet comprises polymer, said polymer further comprising from about 0.01 to about 5.0 weight percent ultraviolet stabilizer, based on the weight of said polymer.

51. The optical display of claim 48 wherein said specific pore volume for the second plurality of pores is at least about 40 cm³/m².

52. The optical display of claim 43, wherein the average thickness of said nonwoven sheet is from about 20 µm to about 250 µm.

53. The optical display of claim 43, wherein said nonwoven sheet comprises a plurality of plexifilamentary film-fibrils, wherein said fibrils comprise polymer containing pores.

54. The optical display of claim 53, wherein said polymer has an absorption coefficient of about $10^{-4}$ m²/g or less.

55. The optical display of claim 53, wherein said polymer is at least one polymer selected from the group consisting of polyester, polyolefin, perfluoropolymer, hydrofluoropolymer, acetal, polycarbonate and polysulfone.

56. The optical display of claim 53, wherein said polymer comprises polyolefin.

57. The optical display of claim 56, wherein said polyolefin comprises polyethylene.

58. The optical display of claim 57, wherein said polyethylene is a linear high density polyethylene which has an upper limit of melting range of about 130° to 137°C., a density in the range of 0.94 to 0.98 g/cm³ and a melt index as defined by ASTM D-1238-57T, Condition F, of between 0.1 to 100.

59. The optical display of claim 43, wherein the reflectivity of said nonwoven sheet changes by no more than about 4% reflectivity over the wavelength range of 380 nm to 780 nm.

60. The optical display of claim 43, wherein said nonwoven sheet comprises polymer, said polymer further comprising from about 0.05 to about 50 weight percent particulate filler based on the weight of said polymer.

61. The optical display of claim 43, wherein at least one face of said nonwoven sheet has been subjected to at least one treatment selected from the group consisting of corona treatment and plasma treatment.

62. The optical display of claim 43, further comprising a backing support material laminated to said nonwoven sheet.

63. The optical display of claim 43, further comprising a specular reflective layer positioned on the face of said nonwoven sheet facing away from said light source.

64. The optical display of claim 63, wherein said specular reflective layer comprises a metalized polymer sheet or metal foil.

65. The optical display of claim 43, wherein said diffuse reflector comprises a laminate of a plurality of layers of nonwoven sheet.

66. The optical display of claim 65, wherein said laminate comprises two layers of nonwoven sheet and adhesive, the average thickness of said diffuse reflector is less than about 400 μm, and the photopic reflectance of said diffuse reflector over the wavelength range of 380 nm to 780 nm is at least about 96%.

67. The optical display of claim 65, wherein said laminate comprises three layers of nonwoven sheet and adhesive, the average thickness of said diffuse reflector is less than about 600 μm, and the photopic reflectance of said diffuse reflector over the wavelength range of 380 nm to 780 nm is least about 97%.

68. The optical display of claim 65, wherein said laminate comprises four layers of nonwoven sheet and adhesive, the average thickness of said diffuse reflector is less than about 900 μm, and the photopic reflectance of said diffuse reflector over the wavelength range of 380 nm to 780 nm is at least about 98%.

69. The optical display of claim 43, wherein said structure is a sign cabinet comprising walls, wherein at least a portion of one of said walls is lined with said diffuse reflector.

70. The optical display of claim 43, wherein said structure is a luminaire comprising walls, wherein at least a portion of one of said walls is lined with said diffuse reflector.

71. The optical display of claim 43, wherein said diffuse reflector lines at least a portion of said optical cavity facing said light source.

72. The optical display of claim 43, wherein said display panel is a liquid crystal optical display.

73. The optical display of claim 43, wherein said diffuse reflector lines at least a portion of said optical cavity and partially wraps around said light source so as to direct light from said light source through said display panel.

74. The optical display of claim 73, wherein said optical cavity includes a light guide positioned within said optical cavity for directing light from said light source toward said display panel.

75. The optical display of claim 74, wherein said diffuse reflector reflects light from said light source toward said light guide.

76. The article of claim 43 wherein said fibers are flash-spun fibers.

77. A diffuse reflector comprises a nonwoven sheet comprising fibers and inter-fiber pores, and containing a plurality of pores, wherein the specific pore volume is at least 34 cm³/m² for the plurality of pores having a mean pore diameter as measured by mercury porosimetry of from 0.01 μm to 1.0 μm.

* * * * *

UNITED STATES PATENT AND TRADEMARK OFFICE
CERTIFICATE OF CORRECTION

PATENT NO. : 7,660,040 B2
APPLICATION NO. : 11/349487
DATED : February 9, 2010
INVENTOR(S) : Starry et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 213 days.

Signed and Sealed this

Thirtieth Day of November, 2010

David J. Kappos
*Director of the United States Patent and Trademark Office*